(12) United States Patent
Bjornard et al.

(10) Patent No.: US 9,625,783 B2
(45) Date of Patent: Apr. 18, 2017

(54) CONTROLLED HEATING FOR ELECTROCHROMIC DEVICES

(71) Applicant: SAGE Electrochromics, Inc., Faribault, MN (US)

(72) Inventors: Erik Jon Bjornard, Lakeville, MN (US); Bryan D. Greer, Northfield, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 0 days.

(21) Appl. No.: 14/815,493

(22) Filed: Jul. 31, 2015

(65) Prior Publication Data

US 2016/0033837 A1     Feb. 4, 2016

Related U.S. Application Data

(60) Provisional application No. 62/031,776, filed on Jul. 31, 2014.

(51) Int. Cl.
     *G02F 1/15*      (2006.01)
     *G02F 1/153*      (2006.01)
     *G02F 1/1333*      (2006.01)

(52) U.S. Cl.
     CPC ........ *G02F 1/153* (2013.01); *G02F 1/133382* (2013.01)

(58) Field of Classification Search
     CPC ............................ G02F 1/153; G02F 1/133382
     USPC .................................... 359/265–275; 345/105
     See application file for complete search history.

(56) References Cited

U.S. PATENT DOCUMENTS

| | | | | |
|---|---|---|---|---|
| 4,728,177 A | * | 3/1988 | Green ................... | G02F 1/1523 235/382.5 |
| 6,762,150 B2 | * | 7/2004 | Sawano ................. | B41J 3/4076 347/163 |
| 2009/0323161 A1 | | 12/2009 | Fuss et al. | |
| 2011/0260961 A1 | | 10/2011 | Burdis | |
| 2012/0196180 A1 | | 8/2012 | Nakamura | |

(Continued)

OTHER PUBLICATIONS

International Search Report and Written Opinion from PCT/US2015/043294, Date of mailing Mar. 18, 2016, Sage Electrochromics, Inc., pp. 1-17.

*Primary Examiner* — Tuyen Tra
(74) *Attorney, Agent, or Firm* — Robert C. Kowert; Meyertons, Hood, Kivlin, Kowert & Goetzel, P.C.

(57) ABSTRACT

An electrochromic device is structured to selectively heat one or more particular regions of a conductive layer of the electrochromic device. An electrical potential difference can be induced across the conductive layer to heat one or more layer regions. The conductive layer can be one of at least two conductive layers on opposite sides of an electrochromic film stack, and an electrical potential difference can be induced between the conductive layers to cause at least some of the electrochromic film stack to change transmission levels. The conductive layer can include regions with different sheet resistances, so that one or more regions are structured to generate more heat than other regions of the conductive layer when an electrical potential difference is induced across the conductive layer. Separate layer regions can include separate chemical species. The conductive layer can be geometrically structured so that some layer regions have a greater sheet resistance than other regions.

20 Claims, 14 Drawing Sheets

(56) References Cited

U.S. PATENT DOCUMENTS

2013/0222878 A1    8/2013   Greer et al.
2014/0204448 A1    7/2014   Bergh et al.

* cited by examiner

CONTROLLED HEATING FOR ELECTROCHROMIC DEVICES

This application claims benefit of priority to U.S. Provisional Patent Application No. 62/031,776, filed Jul. 31, 2014 titled "CONTROLLED HEATING FOR ELECTROCHROMIC DEVICES," which is hereby incorporated by reference herein in its entirety.

BACKGROUND

Electrochromic devices include electrochromic materials that are known to change their optical properties, such as coloration, in response to the application of an electrical potential difference, thereby making the device more or less transparent or more or less reflective. Typical electrochromic ("EC") devices include a counter electrode layer ("CE layer"), an electrochromic material layer ("EC layer") which is deposited substantially parallel to the counter electrode layer, and an ionically conductive layer ("IC layer) separating the counter electrode layer from the electrochromic layer respectively. In addition, two transparent conductive layers ("TC layers") respectively are substantially parallel to and in contact with the CE layer and the EC layer. The EC layer, IC layer, and CE layer can be referred to collectively as an EC film stack, EC thin film stack, etc. The EC film stack, and conductive layers on opposite sides of the EC film stack, can be referred to collectively as an "EC stack".

When an electrical potential difference, also referred to herein as a "electrical potential difference", is applied across the layered structure of the electrochromic device, such as by connecting the respective TC layers to a low voltage electrical source, ions, which can include Li+ ions stored in the CE layer, flow from the CE layer, through the IC layer and to the EC layer. In addition, electrons flow from the CE layer, around an external circuit including a low voltage electrical source, to the EC layer so as to maintain charge neutrality in the CE layer and the EC layer. The transfer of ions and electrons to the EC layer causes the optical characteristics of the EC layer, and optionally the CE layer in a complementary EC device, to change, thereby changing the coloration and, thus, the transparency of the electrochromic device.

Changes in coloration of a medium, which can include one or more layers, stacks, devices, etc., can be described as changes in "transmission" of the medium. As used herein, transmission refers to the permittance of the passage of electromagnetic (EM) radiation, which can include visible light, through the medium, and a "transmission level" of the medium can refer to a transmittance of the medium. Where a medium changes transmission level, the medium may change from a clear transmission state ("full transmission level") to a transmission level where a reduced proportion of incident EM radiation passes through the medium. Such a change in transmission level may cause the coloration of the medium to change, the transparency to change, etc. For example, a medium which changes from a full transmission level to a lower transmission level may be observed to become more opaque, darker in coloration, etc.

In some cases, an EC device can switch between separate transmission levels based at least in part upon application of an electrical potential difference, also referred to herein as a voltage difference, across the EC device. Such application, which can include applying one or more separate voltages to one or more separate layers of the EC device, can cause one or more layers of the EC stack, including the EC layer, CE layer, etc. to change coloration, transparency, etc. In some cases, it may be desirable for different regions of an EC stack to change transmission levels differently, so that application of an electrical potential difference across the EC stack causes separate regions of the EC stack to change from to separate ones of two or more different transmission levels.

In some cases, the rate at which one or more portions of an EC stack change transmission level is associated with the temperature of the portions of the EC stack. In order to ensure that an EC stack switches at acceptable speeds, an EC stack can be heated. However, heating an EC stack to ensure such performance of an EC stack can require substantial amounts of electrical power. For example, where an EC stack is required to switch transmission often, the EC stack may be required to remain above a certain temperature, which may require continuous heating of the EC stack, and may further require continuous expenditure of electrical power to enable such continuous heating. In another example, where an EC stack is required to switch transmission on short notice, an EC stack may be required to be heated rapidly, which may require a substantial expenditure of electrical power. Furthermore, in some cases, uniformity of heating of one or more portions of an EC stack is desired.

Figure 1:
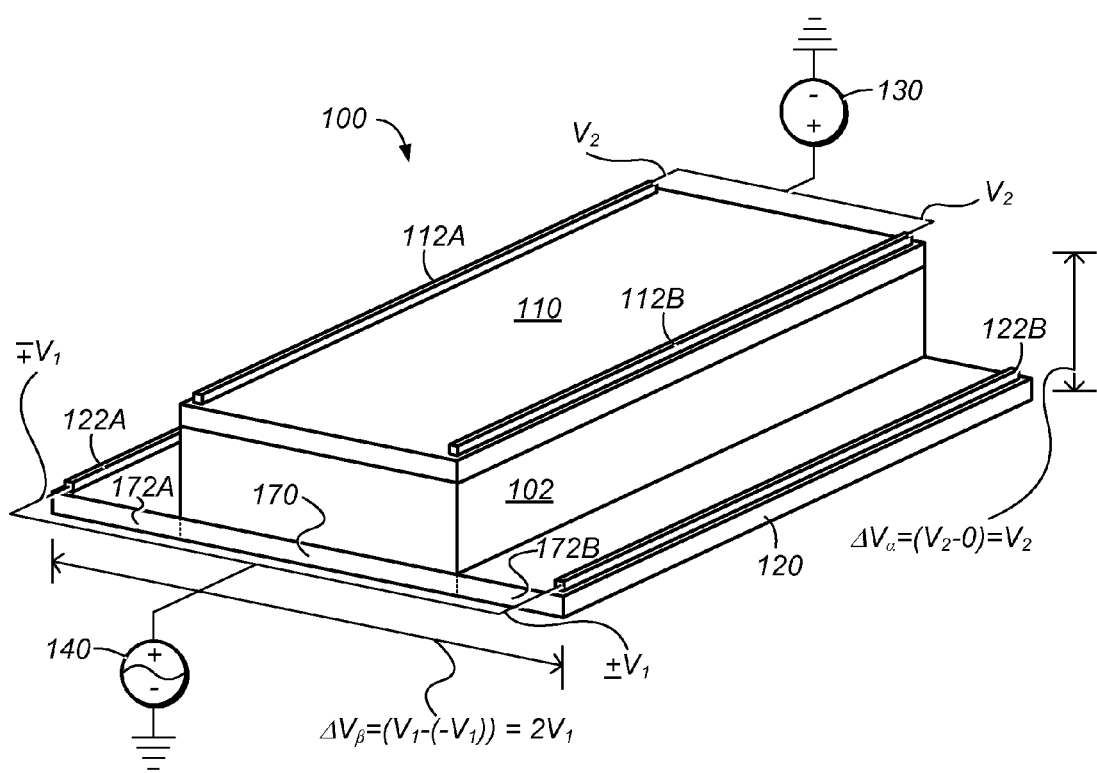
FIG. 1 illustrates a perspective view of an EC device which comprises an EC film stack and conductive layers on opposite sides of the EC film stack, where one conductive layer is structured to be heated based at least in part upon an electrical potential difference across the layer, according to some embodiments.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of an electrochromic (EC) device and methods for configuring an electrochromic device are disclosed. An EC device, according to some embodiments, can be configured to selectively heat one or more particular regions of a conductive layer included in the EC device. Such selective heating can be enabled by configurations of electrodes coupled to the conductive layer, varying sheet resistance throughout the conductive layer, varying geometric structure of the conductive layer, etc. The conductive layer can be separated from an EC film stack of the EC device by another conductive layer, which is adjacent to the EC film stack, and one or more additional layers, including an insulating layer. The methods for configuring an EC device can include methods for configuring the EC device to selectively heat one or more particular regions of a conductive layer in the EC device, relative to one or more remainder regions of the conductive layer. An EC device, according to some embodiments, can include a thermally-conductive layer, with a coupled heat source, configured to be coupled to an EC stack so that the thermally-conductive layer can distribute heat generated by the heat source to the EC stack. In some embodiments, an EC device is included in a device which also includes a control system that selectively commands heating of one or more portions of the EC device, based at least in part upon determination of one or more trigger events associated with the device. Such trigger events can include one or more particular end-user interactions, user commands, etc. associated with the device.

As used herein, "configuring" an EC device, conductive layer, etc. can be referred to interchangeably as "structuring" the EC device, conductive layer, etc. An EC device conductive layer, etc. which is "configured to" do something can be referred to interchangeably as an EC device conductive layer, etc. which is "structured" to do something, "structurally configured" to do something, etc.

I. Controlled Electrochromic Heating with Conductive Layer Regions

In some embodiments, an electrochromic (EC) device includes an EC film stack which is structured to switch between separate transmission patterns, based at least in part upon an electrical potential difference (also referred to herein as a "electrical potential difference") across the EC film stack. The EC device can include conductive layers on opposite sides of the EC film stack, and separate voltages applied to the opposite conductive layers can induce an electrical potential difference across the EC film stack.

In some embodiments, an EC device is structured to heat one or more portions of the EC film stack. Such heating can improve transmission switching performance of the EC film stack. For example, where an EC film stack is at a relatively low temperature (e.g., 20 degrees Fahrenheit), the rate at which the EC film stack switches transmission levels when a given electrical potential difference is induced across the EC film stack can be less than when the EC film stack is at a higher temperature (e.g., 72 degrees Fahrenheit).

An EC film stack, as referred to herein, can include a counter-electrode (CE) layer, an electrochromic (EC) layer, and an ion conducting (IC) layer between the two. In some embodiments, one of the CE layer or the EC layer is structured to reversibly insert ions such as cations, including one or more of H+, Li+, D+, Na+, K+ or anions, including one or more of OH−, especially made of an anodic (or respectively cathodic) electrochromic material; and the other of the CE layer or the EC layer is structure to reversibly inserting said ions, especially made of a cathodic (or respectively anodic) electrochromic material. The IC layer, in some embodiments, is structured to include an electrolyte layer. The EC film stack may be characterized in that at least one of the CE layer or the EC layer may be structure to reversibly insert said ions, including layer made of an anodic or cathodic electrochromic material, has a sufficient thickness to allow all the ions to be inserted without electrochemically disfunctioning said active layers, in that the IC layer having an electrolyte function comprises at least one layer based on a material chosen from tantalum oxide, tungsten oxide, molybdenum oxide, antimony oxide, niobium oxide, chromium oxide, cobalt oxide, titanium oxide, tin oxide, nickel oxide, zinc oxide optionally alloyed with aluminum, zirconium oxide, aluminum oxide, silicon oxide optionally alloyed with aluminum, silicon nitride optionally alloyed with aluminum or with boron, boron nitride, aluminum nitride, vanadium oxide optionally alloyed with aluminum, and tin zinc oxide, at least one of these oxides being optionally hydrogenated, or nitrided, in that one or more of the CE layer or the EC layer comprises at least one of the following compounds: oxides of tungsten W, niobium Nb, tin Sn, bismuth Bi, vanadium V, nickel Ni, iridium Ir, antimony Sb and tantalum Ta, alone or as a mixture, and optionally including an additional metal such as titanium, rhenium or cobalt, and in that the thickness of one or more of the EC layer or the CE layer is between 70 and 250 um, between 150 and 220 um, etc.

The EC layer can include various materials, including tungsten oxides. The CE layer can include various materials, including one or more tungsten-nickel oxides. The IC layer can include various materials including one or more silicon oxides. The charge can include various charged electrolyte species, including lithium ions. An IC layer can include a layer region, a multilayer region, an interfacial region, some combination thereof, or the like. An IC layer which includes an interfacial region can include one or more component materials of one or more of the EC or CE layer.

In some embodiments, each of the layers of the EC film stack can reversibly insert cations and electrons, the modification of their degree of oxidation as a result of these insertions/extractions leading to a modification in its optical and/or thermal properties. In particular, it is possible to modulate their absorption and/or their reflection at wavelengths in the visible and/or the infrared. An EC film stack can be included in an EC device in which the electrolyte is in the form of a polymer or a gel. For example, a protonically conductive polymer, or a conductive polymer conducting by lithium ions, where the other layers of the system generally being of inorganic nature. In another example, an EC film stack can be included in an EC device where the electrolyte and the other layers of the stack are of inorganic nature, which may be referred to by the term "all solid-state" system. In another example, an EC film stack can be included in an EC device where all of the layers are based on polymers, which may be denoted by the term "all polymer" system.

Where an EC film stack is in a "rest" state, where the EC device including the EC film stack is referred to as being in a full transmission state, the charge resides in the CE layer, reducing it and making it highly transparent. When the device is switched, by inducing a potential difference across the conductive layers on opposite sides of the EC film stack in the EC device, charge, including Lithium ions, move from the CE layer to the EC layer, which causes the transmission level of the EC stack to change. In some embodiments, some of the lithium ions are replaced with another charged electrolyte species that still reduces the CE layer but has a relatively lower transport rate, relative to the lithium ions (either by being larger or by being more strongly bound within the molecular lattice structure of the CE layer). As a result, the rate and amount of transmission level switching by one or more regions of the CE layer can be adjusted. Adjusting a rate and amount of transmission level switching by a CE layer region includes adjusting a rate and amount of transmission level switching by a corresponding EC layer.

Charge electrolyte species having various transport rates can include rare earth and alkali metals. These are species heavier or more tightly bound than Lithium and would include, for example, sodium, potassium, rubidium, cesium, francium, beryllium, magnesium, calcium, strontium, barium, and radium.

For example, in some embodiments, a CE layer of an EC film stack can be deposited on a conductive layer, which can include a transparent conductive layer including ITO, and various different charged electrolyte species can be introduced, implanted, etc. into separate CE layer regions. For example, magnesium ions can be implanted in one or more CE layer regions, and sodium ions can be implanted into one or more other CE layer regions. It should be understood that the pattern, depth, and dosage of ion implantation, as discussed throughout the disclosure, can be controlled. For example, aluminum foil masking can be utilized to selectively expose a pattern of CE layer regions to implantation of one or more particular charged electrolyte species.

In some embodiments, heating of one or more portions of an EC film stack is enabled via a current, electrical potential difference, etc. induced through a portion of the EC device. An electrical potential difference can be induced through one or more portions of the EC device via an electrical potential difference between two or more electrodes coupled to a given conductive layer. Such an induced electrical potential difference can cause a current to flow through a conductive layer. In some embodiments, passing a current through a conductive layer causes heat to be generated, in one or more regions of the conductive layer, based at least in part upon a resistance of the regions of the conductive layer through which the current flows. A conductive layer can comprise one or more various chemical species which include one or more various levels of resistance to electrical current. As a result, passing an electrical current through one or more regions of the conductive layer can result in heat generation in the one or more regions, based at least in part upon a resistance of the conductive layer in the one or more regions.

Heating a region of the conductive layer can result in heating one or more regions of the EC film stack of the EC device. Such regions of the EC film stack can include regions which correspond to the regions of the conductive layer which are heated. For example, heat generated in a conductive layer region can be distributed to an EC film stack to which the conductive layer is coupled.

In some embodiments, the conductive layer through which a current is induced to heat one or more regions of the conductive layer (also referred to herein as conductive layer regions) is also used to induce an electrical potential difference across an EC film stack of the EC device to cause one or more regions of the EC film stack ("EC regions") to change transmission levels. Inducing an electrical potential difference across the EC film stack, between at least two conductive layer, and heating one or more regions of one of the conductive layers via inducing a separate electrical potential difference across the given conductive layer can be simultaneous. Such simultaneous current inducement can be enabled based at least in pat upon inducing a direct current across the EC film stack, between opposite conductive layers, and inducing an alternative current across one of the conductive layers, where the frequency of the alternating current is sufficiently high to preclude the EC film stack from switching transmission levels based at least in part upon the alternation. Such a sufficiently-high switching frequency, in some embodiments, includes a switching frequency that is equal to or greater than 100 Hertz.

In some embodiments, each of the EC regions, conductive layer regions, etc. of the EC device may have the same or different sizes, volume, and/or surface areas. In other embodiments, each of the EC regions, conductive layer regions, etc. may have the same or different shapes (including curved or arcuate shapes).

FIG. 1 illustrates a perspective view of an EC device which comprises an EC film stack and conductive layers on opposite sides of the EC film stack, where one conductive layer is structured to be heated based at least in part upon an electrical potential difference across the layer, according to some embodiments.

EC device 100 includes an EC film stack 102 and conductive layers 110, 120 coupled to opposite surface of the EC film stack 102. The EC film stack 102 can include one or more of an EC layer, IC layer, and CE layer. Conductive layers, as referred to herein, can include one or more transparent conductive (TC) layers. Each separate conductive layer 110, 120 includes a set of electrodes 112A-B, 122A-B which are each coupled to a separate power source 130, 140. Power source 130 is a direct current (DC) power source, while power source 140 includes both DC and alternating current (AC) components. Such a power source 140 can include a half-bridge circuit, which includes at least two electronic switches, including MOSFETs, where the half-bridge circuit can be controlled from a pulse width modulator (PWM). As a result, power source 140 can induce a particular voltage, in each electrode 112A-B, which switches polarity at a sufficiently high frequency to preclude the EC film stack 102 from switching transmission state based on the AC electrical potential difference induced between electrodes 112A-B. Such an alternating electrical potential difference across layer 110 can result in heating of one or more regions of layer 110, based at least in part upon one or more characteristics of the layer, including resistivity of one or more material species included in the layer 110, geometric structure of the layer 110, arrangement of the electrodes 112A-B in the layer, etc. As used herein, a difference "across" a single layer between separate electrodes on the same layer, including the illustrated electrical potential difference between the electrodes 112A-B of layer 120, can be referred to interchangeably as being a difference "in parallel with" the layer. In addition, the net voltage at conductive layer 110, based at least in part upon the high-frequency alternating current, can be a constant voltage and the net current flow across the layer 110 can be negligible, which can result in an electrical potential difference being induced across EC film stack 102 between conductive layer 110 and conductive layer 120.

As shown in the illustrated embodiment, power sources 130 and 140 each induce a constant net voltage between the set of electrodes coupled to the respective power source, resulting in an electrical potential difference between the separate conductive layers to which each separate set of electrodes is coupled, which can cause one or more regions of the EC film stack to switch between separate transmission patterns. As shown, power source 130 induces a voltage "$V_2$" at each electrode 112A-B coupled to conductive layer, and power source 140 induces a net voltage of "0 volts" at each electrode 122A-B, thus resulting in an electrical potential difference $\Delta V_\alpha = (V_2 - 0) = V_2$ across the EC film stack 102 between the two layers 110, 120. As used herein, a difference "across" a single layer between two layers, including the illustrated electrical potential difference between the layers 110, 120 and across layer 102, can be referred to interchangeably as being a difference "perpendicular with" one or more of the layers 110, 120, 102.

As further shown in the illustrated embodiment, while the net voltage applied to electrodes 122A-B, and thus conductive layer 120, is a net voltage of zero volts, power source 140 induces an alternating current through layer 120 via switching the polarity of the voltage applied to the set of electrodes 122A-B coupled to the layer 120. The frequency of switching, as noted above, can be sufficiently great to preclude the EC film stack 102 from responding to the instantaneous electrical potential difference across the layer 120. As a result, the EC film stack 102 responds to the net voltage of layer 120, which is a net voltage of zero volts, although the instantaneous electrical potential difference across layer 120 and between electrodes 122A-B, is $\Delta V_\beta = (V_1 - (-V_1)) = 2V_1$.

In some embodiments, layer 110 includes one or more regions, having one or more characteristics, which generate heat based at least in part upon the alternative current through the layer 110 between electrodes 112A-B. Such generated heat can be transmitted from layer 110 to EC film stack 102 to heat one or more corresponding regions of the EC film stack 102. Heating the one or more regions of the EC film stack 102 can result in those regions switching at a faster rate than other regions of the EC film stack when an electrical potential difference is induced across one or more portions of the EC film stack 102. Heating one or more regions of one or more of a conductive layer, EC film stack, etc. can include heating one or more regions more than one or more other regions.

In some embodiments, an entire conductive layer can be heated to heat an EC film stack. Such heating can consume extensive amounts of electrical power. For example, in the illustrated embodiment, an entirety of layer 120 can be uniformly heated, based at least in part upon a uniform alternating current induced through the layer 120 between electrodes 112A-B. In addition, in some embodiments, certain regions of the EC device, including certain regions of the EC film stack, are structured to switch transmission levels more often, to a greater or lesser degree, etc. relative to other such regions. Furthermore, in some embodiments, switching speed in some EC film stack regions is more important than switching speed in other regions. As a result, while heating of some EC regions may be desired, heating of some other EC regions may be considered a waste of electrical power to achieve such heating, as such heating is not necessary. Furthermore, in some embodiments, uniformity of heating of some EC regions may be prioritized over uniformity of heating of other EC regions.

In some embodiments, heating an entirety of a conductive layer, to heat one or more regions of an EC film stack, may be considered to be a wasteful expenditure of resources. For example, in the illustrated embodiment, while heating region 170 of layer 120 can result in heating of the EC film stack 102, heating regions 172A-B may not result in significant heating of EC film stack 102; as a result, electrical energy expended to heat regions 172A-B may be considered a waste of electrical power.

Figure 2:
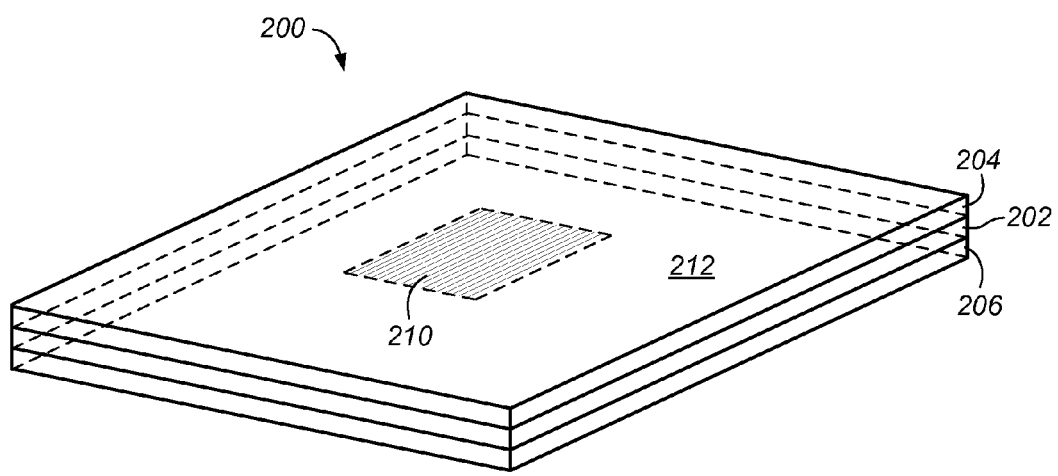
FIG. 2 illustrates a perspective view of an EC device which comprises an EC film stack and conductive layers on opposite sides of the EC film stack, where one conductive layer is structured to selectively heat a particular limited region of the conductive layer, according to some embodiments.

FIG. 2 illustrates a perspective view of an EC device which comprises an EC film stack and conductive layers on opposite sides of the EC film stack, where one conductive layer is structured to selectively heat a particular limited region of the conductive layer, according to some embodiments. EC device 200 includes an EC film stack 202 and conductive layers 204, 206 on opposite sides of the EC film stack 202. Such conductive layers 204, 206 can also be referred to as being coupled to opposite adjacent surfaces of EC film stack 202. In some embodiments, some or all of EC device 200 can be included in EC device 100 illustrated in FIG. 1.

In some embodiments, heating an EC film stack via applying an electrical potential difference to an entire conductive layer can constitute a wasteful expenditure of electrical power. For example, while it may be desired to heat a particular limited region 210 in the illustrated conductive layer 204, heating a remainder region 212 of the layer 204 may comprise a waste of resources. Such "targeted" heating may be desirable to enable targeted heating of one or more corresponding regions of the EC film stack 202 which at least partially overlap region 210. In some other embodiments, while an entirety of regions 210, 204 of layer 204 may be required to enable an electrical potential difference to be induced across EC film stack 202 between layers 204, 206, a limited portion of the volume of the layer 204 may be required to generate sufficient heat to heat one or more portions of the EC film stack 202, including an entirety of the stack 202, to one or more requisite temperatures to enable at least a certain transmission switching speed of the one or more portions of the stack 202. As discussed further herein, various embodiments of an EC device can include various structures of a conductive layer to structure the EC device to selectively heat one or more particular limited regions of the conductive layer.

As used herein, heating one or more regions of an EC film stack, based at least in part upon heating one or more particular limited regions of a conductive layer, can include heating an entirety of the EC film stack, based at least in part upon heating one or more particular regions of a conductive layer. In some embodiments, the EC device 200 can be included in the EC device 100 illustrated in FIG. 1, so that conductive layer 204 extends beyond the boundaries of EC film stack 202, similar to the layer 120 in FIG. 1 extending beyond the EC film stack 102. As a result, the particular limited region 210 of conductive layer 204 may correspond (i.e., "overlap") with the entirety of EC film stack 202, so that the entirety of the EC film stack is heated based at least in part upon selectively heating the particular limited region 210 of layer 204.

Figure 3:
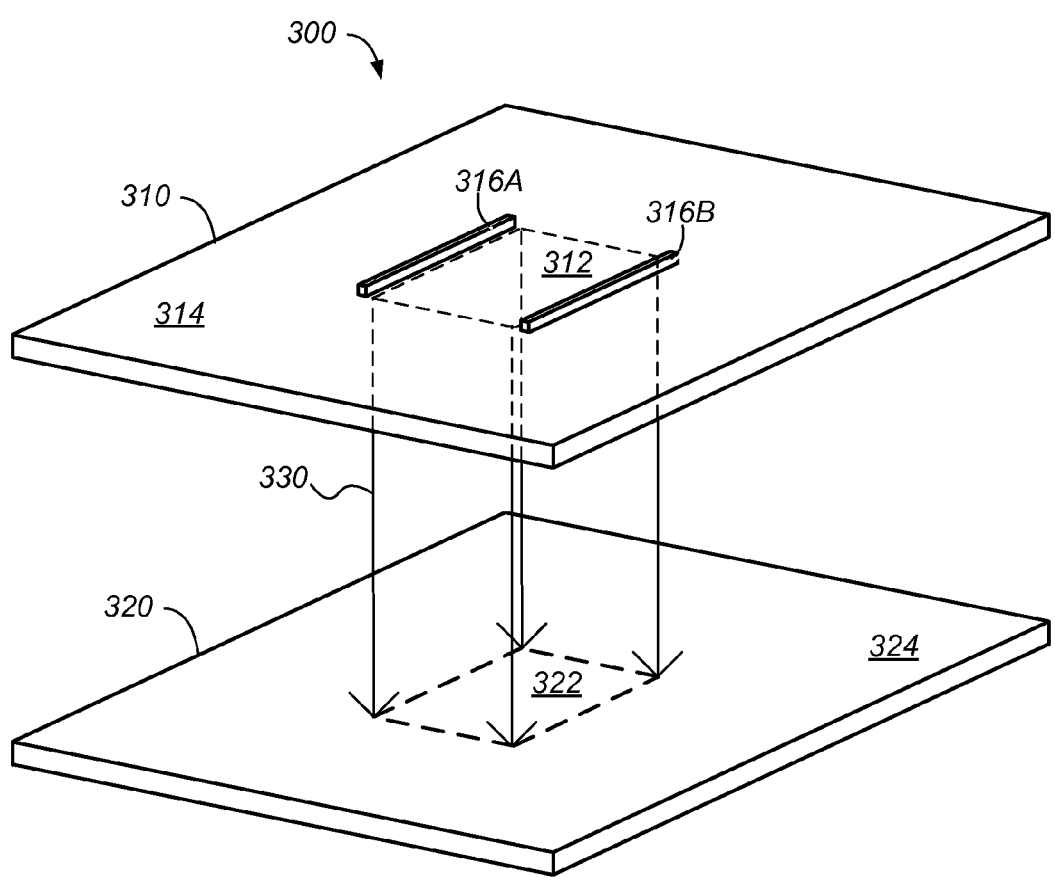
FIG. 3 illustrates a perspective view of an EC film stack and a conductive layer which is structured to be selectively heated, in a particular limited region, based at least in part upon an electrode configuration of the conductive layer, according to some embodiments.

FIG. 3 illustrates a perspective exploded view of an EC device which includes an EC film stack and a conductive layer which is structured to be selectively heated, in a particular limited region, based at least in part upon a particular arrangement of electrodes coupled to the conductive layer, according to some embodiments. EC device 300 includes a conductive layer 310 which is coupled to an EC film stack 320 and is structured to at least generate and distribute heat 330 to one or more regions 322, 324 of the EC film stack 320. In some embodiments, EC device 300 is included in one or more portions of EC devices illustrated and disclosed elsewhere herein, including EC device 200 illustrated in FIG. 2. In some embodiments, conductive layer 310 is coupled to EC film stack 320 via one or more intermediate layers, including one or more insulating layers, bonding layers, encapsulation layers, anti-reflective layers, infrared cut-off filter layers, obscuration layers, some combination thereof, etc.

In some embodiments, an EC device is structured to selectively heat a particular limited region of a conductive layer, based at least in part upon a particular arrangement of electrodes coupled to the conductive layer. For example, a set of electrodes structured to induce an electrical potential difference across a given conductive layer can be coupled to the conductive layer in a particular arrangement that results in the electrodes being coupled on adjacent sides of the particular limited region. As a result, current flow through the conductive layer can be at least partially restricted to the particular limited region between the electrodes, so that heating in regions of the conductive layer that are beyond the particular limited region is at least partially mitigated.

In the illustrated embodiment, for example, conductive layer 310 includes a set of electrodes 316A-B which are coupled to the conductive layer in such an arrangement that the two electrodes 316A-B are on opposite sides of a particular limited region 312 of the conductive layer 310. The illustrated region 312 is approximately located in a central region of the area of the conductive layer 310, but it can be understood that the region 312 can be located in any region of the area of the conductive layer 310. For example, region 312, in some embodiments, is bounded by one or more edges of the conductive layer 310.

As shown, the arrangement of electrodes 316A-B to bound opposite edges of the particular limited region 312 of conductive layer 310 can result in a current flow between electrodes 316A-B in the conductive layer 310 being at least partially restricted to a flow through region 312 between the electrodes 316A-B. Conversely, current flow through some or all of the remainder region 314 of the conductive layer 310 can be at least partially mitigated. As a result, when an electrical potential difference is induced between electrodes 316A-B, the region 312 can be heated, relative to remainder 314. Heating one region, including region 312, relative to another region, including region 314, can include heating one region more than another region. For example, while at least some heating of remainder region 314 may occur when an electrical potential difference is induced between electrodes 316A-B, the heating of region 312 can be greater than that of remainder region 314. Furthermore, uniformity of heating in region 312 can be maximized, relative to region 314. Such uniformity may be desirable, particularly where uniform heating of one or more particular regions of the EC device which correspond to region 312 is desired. As a result, while other regions of conductive layer 310 may be at least partially heated, which can include non-uniform heating throughout region 314, region 312 may be heated with greater uniformity than region 314 when an electrical potential difference is induced between electrodes 316A-B.

In some embodiments, heating one or more particular regions of a conductive layer can be based at least in part upon a resistance of one or more chemical species included in the particular regions of the conductive layer to electrical current. For example, some or all of conductive layer 310 can be comprised of one or more chemical species, including indium tin oxide (ITO) which have a certain resistance to electrical current, such that inducing an electrical current through a portion of the layer which includes the one or more chemical species can result in heat generation, based at least in part upon said resistance.

In some embodiments, inducing an electrical potential difference between electrodes 316A-B results in heat generation in at least the particular limited region 312 of conductive layer 310. Such heat can be transmitted 330 to one or more portions of an EC film stack 320 to which the conductive layer 310 is coupled. Where the conductive layer 310 is coupled to the EC film stack via one or more additional EC device layers, the heat transmitted 330 from layer 310 to EC film stack 320 can be transmitted through one or more intermediate EC device layers.

In some embodiments, heat transmitted 330 from one or more regions of conductive layer 310 to an EC film stack are transmitted to one or more particular regions of the EC film stack which correspond to the one or more regions of the conductive layer 310, so that those particular regions of the EC film stack are heated, relative to other regions of the EC film stack. For example, in the illustrated embodiment, heat generated at region 312 of the conductive layer is transmitted 330 from region 312 of the conductive layer 310 to a corresponding region 322 of the EC film stack 320. The corresponding region 322 can include a region of the EC film stack which at last partially overlaps with the region 312 in the EC device 300. For example, in the illustrated embodiment, regions 312 and 322 at least partially vertically overlap in EC device 300, so that region 322 comprises the closest region of EC film stack 320 to region 312 of layer 310 and heat transmitted downwards from region 312 of layer 310 to other layers of EC device 300 is predominantly received at region 322 of EC film stack 320. In some embodiments, heat transmitted to one or more regions of an EC film stack is conducted throughout the EC film stack, such that some or all of the EC film stack is heated based at least in part upon heat transmitted to one or more particular regions of the EC film stack.

Figure 4:
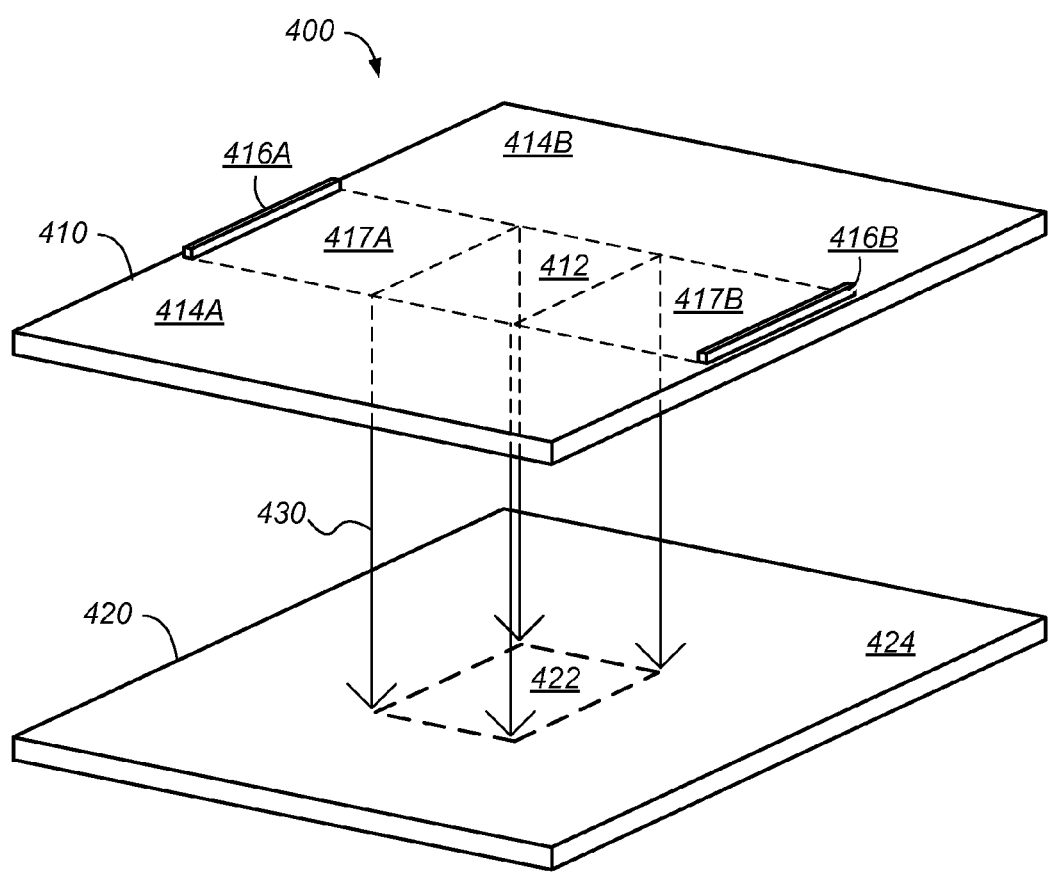
FIG. 4 illustrates a perspective view of an EC film stack and a conductive layer which is structured to be selectively heated, in a particular limited region, based at least in part upon different sheet resistances of different regions of the conductive layer.

FIG. 4 illustrates a perspective view of an EC film stack and a conductive layer which is structured to be selectively heated, in a particular limited region, based at least in part upon different sheet resistances of different regions of the conductive layer. EC device 400 includes a conductive layer 410 which is coupled to an EC film stack 420 and is structured to at least generate and distribute heat 430 to one or more regions 422, 424 of the EC film stack 420. In some embodiments, EC device 400 is included in one or more portions of EC devices illustrated and disclosed elsewhere herein, including EC device 200 illustrated in FIG. 2. In some embodiments, conductive layer 410 is coupled to EC film stack 420 via one or more intermediate layers, including one or more insulating layers, bonding layers, encapsulation layers, anti-reflective layers, infrared cut-off filter layers, obscuration layers, some combination thereof, etc.

In some embodiments, an EC device is structured to selectively heat a particular limited region of a conductive layer, based at least in part upon the conductive layer being structured to include different layer regions with different resistance to electric current (also referred to herein as "sheet resistance"). A conductive layer can be structured to include such variations in sheet resistance in various layer regions where electrodes are coupled to the conductive layer at positions which are remote from a particular limited region of the layer which is to be selectively heated. For example, in the illustrated embodiment, conductive layer 410 includes regions 412, 414A-B, 417A-B, where regions 412 and 417A-B are between the electrodes 416-B coupled to the conductive layer. Where region 412 is the particular limited region that the EC device 400 is structured to selectively heat, electrodes 416A-B can be structured to extend to one set of boundaries of the region 412; as shown, the electrodes 416A-B extend between the width of the region 412 through the layer 410, but not along the entire width of the layer 410. As a result, the electrodes 416A-B do not bound regions 414A-B, and current flow through layer 410, based at least in part upon an induced electrical potential difference between electrodes 416A-B, can flow more uniformly and, in some embodiments, predominantly, through regions 417A-B, 412 of layer 410.

Where region 412 is the particular limited region, and regions 417A-B and 414A-B are remainder regions, regions 417A-B can be structured to have a sheet resistance which is less than that of region 412. Similarly, in some embodiments, region 412 is structured to have a sheet resistance which is greater than the sheet resistance of at least regions 417A-B. A conductive layer 410 where regions 417A-B have reduced sheet resistance, relative to region 412, can result in an increased uniformity of current flow through regions 412, 417A-B between the electrodes 416A-B.

In some embodiments, the sheet resistance of regions 417A-B is less than the sheet resistance of one or more of regions 414A-B. Such variation in sheet resistance can, in some embodiments, result in increased uniformity of current flow through region 412, and thus increased uniformity of heating of region 412, relative to embodiments where regions 414A-B and 417A-B have a common or similar sheet resistance.

In some embodiments, region 412 is structured to have a greater sheet resistance, relative to the sheet resistance of at least regions 417A-B, to structure layer 410 to heat region 412 more than regions 417A-B (i.e., "enhanced heating" of region 412) when an electrical potential difference is induced between electrodes 416A-B. In addition, where the sheet resistance of region 412 is greater than that of at least regions 417A-B, the uniformity of current flow through region 412, and thus heating of region 412, can be increased relative to embodiments where regions 412, 417A-B have a common sheet resistance.

In some embodiments, variations in sheet resistance across various regions of a conductive layer is based at least in part upon variations in one or more characteristics of the conductive layer in the various regions. Such varying characteristics can include variations in chemical species composition of the layer in the various regions. Chemical species can include various different materials, substances, elements, compounds, etc. Different regions of a conductive layer can include different distributions of one or more various chemical species, also referred to herein as "separate" distributions of one or more various chemical species. Different distributions of a species in a region can include variations in density of the species throughout some or all of one or more different layer regions, variations in concentration of the species throughout some or all of one or more different layer regions, variations in depth of the conductive layer in which one or more species are present throughout some or all of one or more different layer regions, etc. For example, a given chemical species may be present, in one conductive layer region in one particular concentration, while the same chemical species may be present in another conductive layer region in a separate concentration. A given distribution of a species in a given region can vary. For example, a distribution of a given species in one layer region can include a variation of species concentration, between opposite boundaries of the layer region, which corresponds to a normal distribution between the opposite boundaries. Different distributions of a species in a region can include the species being present, in one or more distributions, in one region and the species being absent in a different region. For example, in the illustrated embodiment, regions 417A-B can be comprised of at least a metallic chemical species, including gold, while region 412 can be comprised of at least one separate chemical species, including indium tin oxide (ITO). The different species can have different conductivity, resistance, etc.: for example, gold can be a more conductive species than ITO, so that a conductive layer region comprising ITO has a greater sheet resistance than a separate conductive layer region comprising gold. In another embodiment, regions 412, 417A-B can be comprised of ITO, and region 412 can be comprised of ITO and further comprised of one or more different distributions of one or more oxidizing chemical species, including oxygen, which result in greater sheet resistance of region 412 relative to regions 417A-B.

Chemical species can include one or more oxidizing species which increase the oxidation level of a conductive layer region, relative to another region, to adjust the sheet resistance of the conductive layer region. Non-limiting examples of oxidizing species which could be introduced can include oxygen, nitrogen, etc. In another example, one or more of various metallic species can be introduced to change the charge carrier density, charge carrier distribution, etc. in a conductive layer region. Non-limiting examples of such metallic species can include indium, tin, gold, some combination thereof, etc. In short, one or more chemical species in a conductive layer region, where the chemical species can change the charge carrier density, charge carrier distribution, etc. in the conductive layer region, can result in an adjustment of the sheet resistance of the conductive layer region. Chemical species in a conductive layer region can include one or more chemical species, which can be implemented via well-known ion implantation processes.

Chemical species introduction in a conductive layer region can include ion implantation, masked ion beam, focused ion beam, etc. The chemical species distribution can be varied across the various regions to vary the sheet resistance in various conductive layer regions differently. For example, where an ion implantation system is used to implant various ions in the various regions, one or more of the ion dosage, ion energy level, number of ion implantation processes, etc. can be adjusted for each region to establish different chemical species distributions, charge carrier distributions, charge carrier densities, etc. in the various regions, thus establishing different sheet resistances in the various regions. In some embodiments, on or more of ion implantation, a masked ion beam, focused ion beam (FIB), etc. can be used to "draw" a particular sheet resistance pattern into one or more conductive layer regions. In some embodiments, a chemical species "distribution" may include one or more variations in chemical species density, concentration, depth of introduction through a thickness of a conductive layer, etc., across one or more regions of a conductive layer. For example, the depth to which a chemical species is introduced in a conductive layer may vary across the conductive layer, and the sheet resistance of the conductive layer to vary accordingly to the variation in species depth. In another example, the concentration, density, etc. of an introduced chemical species may vary across the conductive layer, and the sheet resistance of the conductive layer to vary accordingly to the variation in species concentration, density, etc.

In some embodiments, the sheet resistance of various conductive layer regions can be adjusted based at least in part upon heating the various conductive layer regions to high temperature in air or oxygen containing gas. Such a process can include selectively exposing various conductive layer regions to the atmosphere during the heating, heating the conductive layer in a specific pattern using a method such as a laser, or a xenon flash lamp, etc. Heating a conductive layer region to high temperature can enable, induce, etc. one or more chemical reactions which oxidize that conductive layer region. In some embodiments, the heating is patterned so that certain conductive layer regions are oxidized, independently of other conductive layer regions which can be heated differently, not at all, etc. As a result, one or more various patterns of oxidation can be created, thus establishing one or more patterns of sheet resistance in the conductive layer which results in structuring the EC device to selectively switch to a transmission pattern corresponding to the sheet resistance pattern. In some embodiments, additional oxidation of a conductive layer results in a higher sheet resistance. In some embodiments, laser annealing can be used to heat particular conductive layer regions to change the sheet resistance in one or more particular "patterns". In some embodiments, the sheet resistance of various conductive layer regions can be adjusted based at least in part upon heating the various conductive layer regions to high temperature in one or more various atmospheres, including one or more mixtures of one or more various gases at one or more atmospheric pressures, etc. In some embodiments, the sheet resistance of various conductive layer regions can be adjusted based at least in part upon heating the various conductive layer regions to high temperature in a vacuum.

In some embodiments, sheet resistance of various conductive layer regions can be adjusted based at least in part upon adjustment of the relative thicknesses of the various conductive layer regions. For example, additional quantities of conductive layer material can be deposited, in various conductive layer regions, to adjust the sheet resistance of the various conductive layer regions. In another example, one or more removal processes can be implemented to selectively remove at least a portion of the thickness of the conductive layer in particular conductive layer regions to adjust the sheet resistance in the various conductive layer regions. Removal processes can include one or more of a laser ablation process, laser cutting process, etching process, etc. Adding or removing thickness to a given conductive layer region can include adding or removing conductive layer material in a conductive layer region according to a particular pattern, so that the sheet resistance distribution in the conductive layer region is patterned. Such a patterning can structure the EC device to selectively switch to a corresponding transmission pattern.

In some embodiments, adding or removing thickness to a given conductive layer region can include adding an additional buffer material to establish a uniform total thickness of a conductive layer which includes the conductive layer material and the buffer material.

In some embodiments, inducing an electrical potential difference between electrodes 416A-B results in heat generation in at least the particular limited region 412 of conductive layer 410. Such heat can be transmitted 430 to one or more portions of an EC film stack 420 to which the conductive layer 410 is coupled. Where the conductive layer 410 is coupled to the EC film stack via one or more additional EC device layers, the heat transmitted 430 from layer 410 to EC film stack 420 can be transmitted through one or more intermediate EC device layers.

In some embodiments, heat transmitted 430 from one or more regions of conductive layer 410 to an EC film stack are transmitted to one or more particular regions of the EC film stack which correspond to the one or more regions of the conductive layer 410, so that those particular regions of the EC film stack are heated, relative to other regions of the EC film stack. For example, in the illustrated embodiment, heat generated at region 412 of the conductive layer is transmitted 430 from region 412 of the conductive layer 410 to a corresponding region 422 of the EC film stack 420. The corresponding region 422 can include a region of the EC film stack which at last partially overlaps with the region 412 in the EC device 400. For example, in the illustrated embodiment, regions 412 and 422 at least partially vertically overlap in EC device 400, so that region 422 comprises the closest region of EC film stack 420 to region 412 of layer 410 and heat transmitted downwards from region 412 of layer 410 to other layers of EC device 400 is predominantly received at region 422 of EC film stack 420, relative to region 424. In some embodiments, heat transmitted to one or more regions of an EC film stack is conducted throughout the EC film stack, such that some or all of the EC film stack is heated based at least in part upon heat transmitted to one or more particular regions of the EC film stack.

Figure 5:
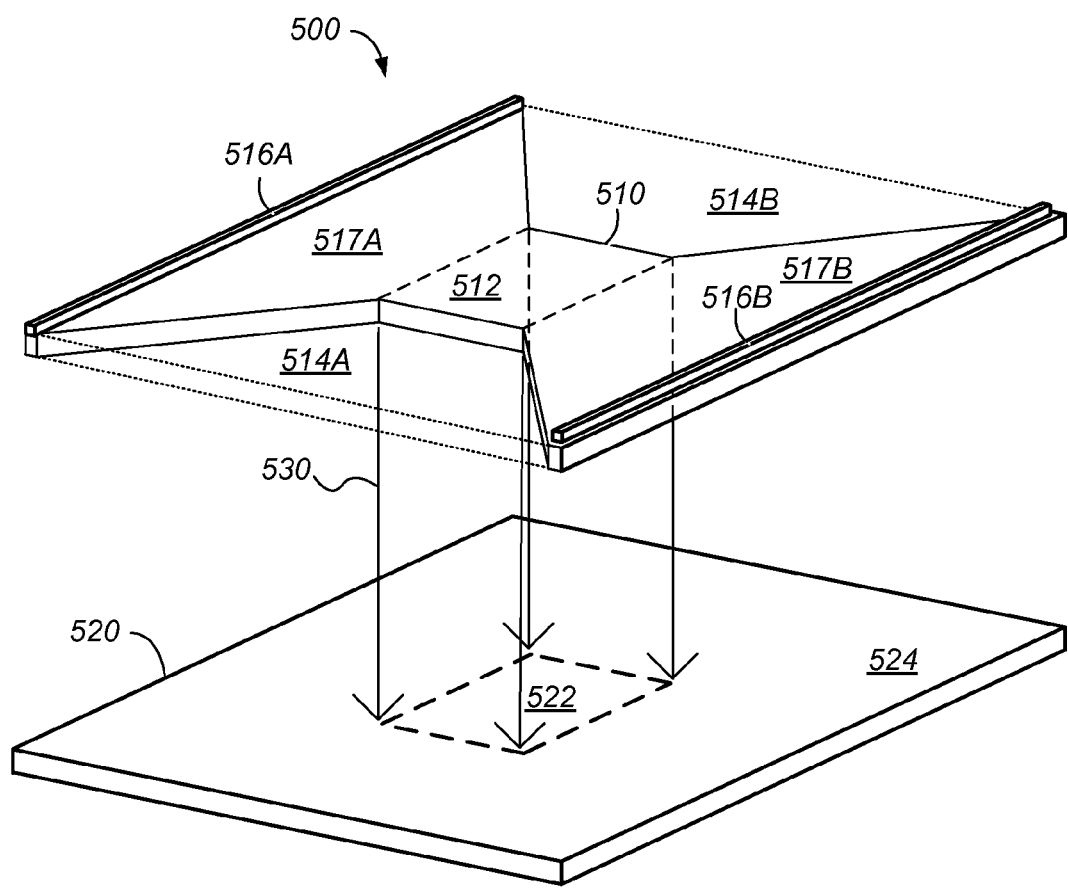
FIG. 5 illustrates a perspective view of an EC film stack and a conductive layer which is structured to be selectively heated, in a particular limited region, based at least in part upon a geometric structure of the conductive layer, according to some embodiments.

FIG. 5 illustrates a perspective view of an EC film stack and a conductive layer which is structured to be selectively heated, in a particular limited region, based at least in part upon a geometric structure of the conductive layer, according to some embodiments. EC device 500 includes a conductive layer 510 which is coupled to an EC film stack 520 and is structured to at least generate and distribute heat 530 to one or more regions 522, 524 of the EC film stack 520. In some embodiments, EC device 500 is included in one or more portions of EC devices illustrated and disclosed elsewhere herein, including EC device 200 illustrated in FIG. 2.

In some embodiments, conductive layer 510 is coupled to EC film stack 520 via one or more intermediate layers, including one or more insulating layers, bonding layers, encapsulation layers, anti-reflective layers, infrared cut-off filter layers, obscuration layers, some combination thereof, etc.

In some embodiments, an EC device is structured to selectively heat a particular limited region of a conductive layer, based at least in part upon a geometric structure of the conductive layer which structures the remainder regions of the conductive layer to have a reduced sheet resistance, relative to the particular limited region.

Resistance of a plane resistor can increase with length of the resistor and decrease with width, relative to the direction of current flow. As a result, a wider conductive layer region through which a given amount of electrical current flows will have reduced resistance, and thus reduced heating, relative to a narrower conductive layer region through which the same given amount of electrical current flows. Furthermore, where a conductive layer design includes electrodes coupled to the conductive layer in an arrangement which is remote from the particular limited region, structuring the conductive layer, electrodes, etc. so that the intermediate remainder regions between the particular limited region and the electrodes are wider than the particular limited region, even if the sheet resistance of each region is similar, can result in the intermediate remainder regions being heated less than the particular limited region when an electrical current is induced to flow through the particular limited region via the intermediate remainder regions.

For example, in the illustrated embodiment, where conductive layer 510 includes a particular limited region 512 and electrodes 516A-B which are coupled to the conductive layer 510 remotely from region 512, the electrodes 516A-B extend approximately through the full width of the layer 510, so that the remainder regions 517A-B between the electrodes and the particular limited region 512 have a greater width, relative to the flow direction of current between the electrodes 516A-B, than the region 512. As a result, the resistance of regions 517A-B to current between electrodes 516A-B is less than that of region 512, which can result in region 512 being heated more than regions 517A-B when a given electrical potential difference is induced between electrodes 516A-B.

In some embodiments, layer 510 is structured to comprise regions 512, 517A-B, and not regions 514A-B. In some embodiments, layer 510 includes regions 514 comprised of chemical species having no conductivity, so that current flow between electrodes 516A-B is restricted to flow through regions 512, 517A-B. In some embodiments, layer 510 includes regions 514A-B which are comprised of chemical species which are at least partially conductive.

In some embodiments, inducing an electrical potential difference between electrodes 516A-B results in heat generation in at least the particular limited region 512 of conductive layer 510. Such heat can be transmitted 530 to one or more portions of an EC film stack 520 to which the conductive layer 510 is coupled. Where the conductive layer 510 is coupled to the EC film stack via one or more additional EC device layers, the heat transmitted 530 from layer 510 to EC film stack 520 can be transmitted through one or more intermediate EC device layers.

In some embodiments, heat transmitted 530 from one or more regions of conductive layer 510 to an EC film stack are transmitted to one or more particular regions of the EC film stack which correspond to the one or more regions of the conductive layer 510, so that those particular regions of the EC film stack are heated, relative to other regions of the EC film stack. For example, in the illustrated embodiment, heat generated at region 512 of the conductive layer is transmitted 530 from region 512 of the conductive layer 510 to a corresponding region 522 of the EC film stack 520. The corresponding region 522 can include a region of the EC film stack which at last partially overlaps with the region 512 in the EC device 500. For example, in the illustrated embodiment, regions 512 and 522 at least partially vertically overlap in EC device 500, so that region 522 comprises the closest region of EC film stack 520 to region 512 of layer 510 and heat transmitted downwards from region 512 of layer 510 to other layers of EC device 500 is predominantly received at region 522 of EC film stack 520, relative to region 524. In some embodiments, heat transmitted to one or more regions of an EC film stack is conducted throughout the EC film stack, such that some or all of the EC film stack is heated based at least in part upon heat transmitted to one or more particular regions of the EC film stack.

Figure 6:
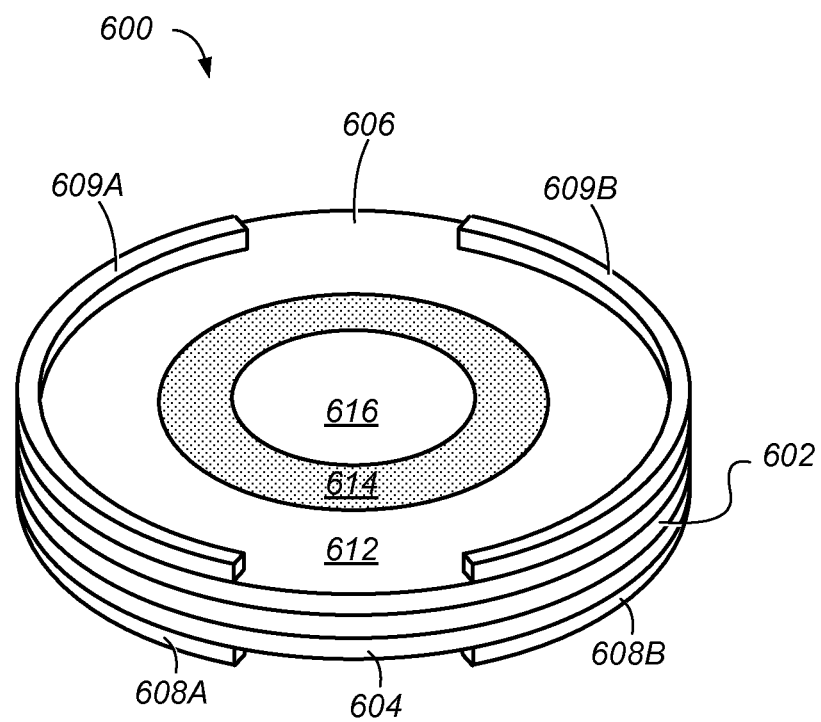
FIG. 6 illustrates a perspective view of an ovoid-shaped EC device which is structured to switch between separate transmission patterns, in different regions of the EC film stack and is structured to selectively heat one or more regions of a conductive layer which corresponds to one or more of the EC film stack regions, according to some embodiments.

FIG. 6 illustrates a perspective view of an ovoid-shaped EC device which is structured to switch between separate transmission patterns, in different regions of the EC film stack and is structured to selectively heat one or more regions of a conductive layer which corresponds to one or more of the EC film stack regions, according to some embodiments. EC device 600 includes at least an EC film stack 602, conductive layers 604, 606 on opposite sides of EC film stack 602, and electrodes 608A-B, 609A-B coupled to separate ones of the conductive layers. In some embodiments, EC device 600 is included in one or more portions of EC devices illustrated and disclosed elsewhere herein, including EC device 200 illustrated in FIG. 2.

In some embodiments, an EC device is included in one or more portions of a camera device. The EC device can be structured to switch between separate transmission patterns to augment camera device operations. For example, an EC device can be included in a camera aperture device, where the EC device is structured to switch between separate transmission patterns to selectively apodize the camera aperture. Such an EC device can be structured to switch a particular region of the EC device to a different transmission level than other regions of the EC device. Such a particular region, in some embodiments, can be an annular region of the EC device. In some embodiments, where rapid and uniform switching of the particular region is desired, the EC device is structured to selectively heat at least the particular region of the EC device.

In some embodiments, EC device 600 is included in a camera device and is configured to apodize the light passing through the camera device, so that less light passes through the periphery of the lens of the camera, relative to the center of the lens. Apodization can include apodizing the EC device 600, where the EC device is comprised in the aperture of the camera device. Such apodization results in diffusion at the edges of the out-of-focus elements captured in an image of a. Such diffusion results in smoothing of the out-of-focus elements, and enables the subject to stand out more vividly against the out-of-focus elements.

In some embodiments, apodizing a camera aperture enables augmented resolution of images by the camera, as the diffraction patterns around an image of a subject on a camera sensor may be reduced. For example, an apodized aperture, reducing the amount of light which passes through the periphery of the lens, can result in an image of a subject where the Airy patterns around the image of the subject are reduced in intensity, if not removed altogether. In addition, sensitivity of the light sensor to aberrations in the lens may be mitigated.

In some embodiments, EC device 600 is structured to selectively switch separate EC regions between separate transmission levels, so that the EC device can selectively apodize one or more of the aperture, lens, etc. of a camera device.

In the illustrated embodiment, for example, EC device 600 has an ovoid shape, which can include a circular shape, and is structured to switch the EC film stack 602 between at least two transmission levels, so that a particular annular region 614 of the EC device 600 switches to a lesser transmission level than remainder regions 612, 616. Such structuring can include variations in resistance in one of the conductive layers which corresponds to the region 614, to structure the electrical potential difference across a corresponding region of the EC film stack to be greater than across EC regions corresponding to regions 612, 616. Such structuring can include variations in ion mobility in one or more layers in the EC film stack in regions which correspond to regions 612, 614, 616. Electrodes 608A-B, 609A-B can be structured, as shown, to follow the curvature of the EC device 600 to promote increased uniformity of charge distribution throughout the EC device 600, relative to some embodiments where the electrodes extend straight, relative to the curvature of the layers 602, 604, 606. As shown, one or more of conductive layers 604, 606 can be structured to selectively heat a particular limited region of the respective conductive layer which corresponds to at least EC region 614. Such a particular limited region can be annular in shape, similar to region 614. Such a region can correspond to a combination of regions 614 and 616.

In some embodiments, various quantities of sets of electrodes are coupled to one or more of the conductive layers in an EC device. The separate conductive layers can include different quantities of sets of electrodes coupled to the respective conductive layer. For example, conductive layer 606 can include a single set of two electrodes 609A-B, while conductive layer 604 can include two sets of two electrodes each, for a total of four electrodes coupled to layer 604. A given set of electrodes can include two or more electrodes which are coupled to different regions of a conductive layer. In one example, including as shown in FIG. 6, the separate electrodes 609A-B in a set of electrodes can be coupled to opposite edges of a conductive layer. It will be understood that, as shown in FIG. 3, a set of electrodes can be coupled to different regions of a layer, where the different regions are not opposite edges of the conductive layer. In some embodiments, where multiple sets of conductive layers are coupled to a conductive layer, one or more sets of electrodes can be structured to be used to induce an electrical potential difference between the separate conductive layers, and across the EC film stack, to cause the EC film stack to switch transmission patterns, while a separate one or more sets of electrodes can be structured to be used to induce a current, electrical potential difference, etc. across the conductive layer to cause selective heating of one or more particular limited regions of the conductive layer. In some embodiments, separate electrodes coupled to a conductive layer are spaced uniformly around the one or more edges of the conductive layer, so that current induced between the separate electrodes is substantially more uniform than if the electrodes are not uniformly spaced. Such augmented uniformity of current distribution through the layer can augment the uniformity of switching of corresponding EC film stack regions, uniformity of heating of various conductive layer regions, etc. As shown in FIG. 6, electrodes coupled to an ovoid or circular conductive layer can be coupled to different regions of the layer so that the sets of electrodes approximate a circular electrode around the edge of the conductive layer. Where additional sets of electrodes are coupled to a conductive layer, e.g., two sets of two electrodes each, the electrodes in the sets may be spaced equidistantly around the circumference of the conductive layer, where the electrodes are coupled around the circumference in alternating sets of electrodes. It will be understood that the disclosed conductive layers and electrodes coupled thereto encompass any number of sets of electrodes coupled to the layer, number of electrodes per set coupled to the layer, arrangement of electrodes coupled to the layer, number of electrodes, sets thereof, etc. coupled to different conductive layers on opposite sides of an EC film stack in an EC device, etc. For example, EC device 600 can include eight electrodes coupled to the conductive layers 604, 606, where two sets of two electrodes each, for a total of four electrodes, are coupled to layer 604 and equidistantly spaced around the circumference of the layer 604, while two sets of two electrodes each, for a total of four electrodes, are coupled to layer 606 and equidistantly spaced around the circumference of the layer 606.

In some embodiments, one or more of the conductive layers in an EC device has a different shape than an EC film stack included in the EC device. As a result, in some embodiments, a conductive layer of an EC device, where the conductive layer is structured to heat a particular limited region of same, can be larger than the EC film stack of the EC device, so that the conductive layer extends beyond the boundaries of the EC film stack, and the EC film stack is coupled to a limited portion of the conductive layer. In some embodiments, the limited portion of the conductive layer to which the EC film stack is coupled can include some or all of the particular limited region of the conductive layer. As a result, heating one or more regions of an EC film stack, based at least in part upon heating one or more particular limited regions of a conductive layer, can include heating an entirety of the EC film stack, based at least in part upon heating one or more particular limited regions of a conductive layer. For example, EC device 600 can include a conductive layer 604 which is structured to selectively heat a particular limited region of the conductive layer 604, relative to a remainder region of the conductive layer 604, where conductive layer 604 extends beyond the boundaries of EC film stack 602, similar to the layer 120 in FIG. 1 extending beyond the EC film stack 102. As a result, the particular limited region of conductive layer 604 may correspond (i.e., "overlap") with the entirety of EC film stack 602, so that the entirety of the EC film stack is heated based at least in part upon selectively heating the particular limited region of layer 604.

Figure 7A:
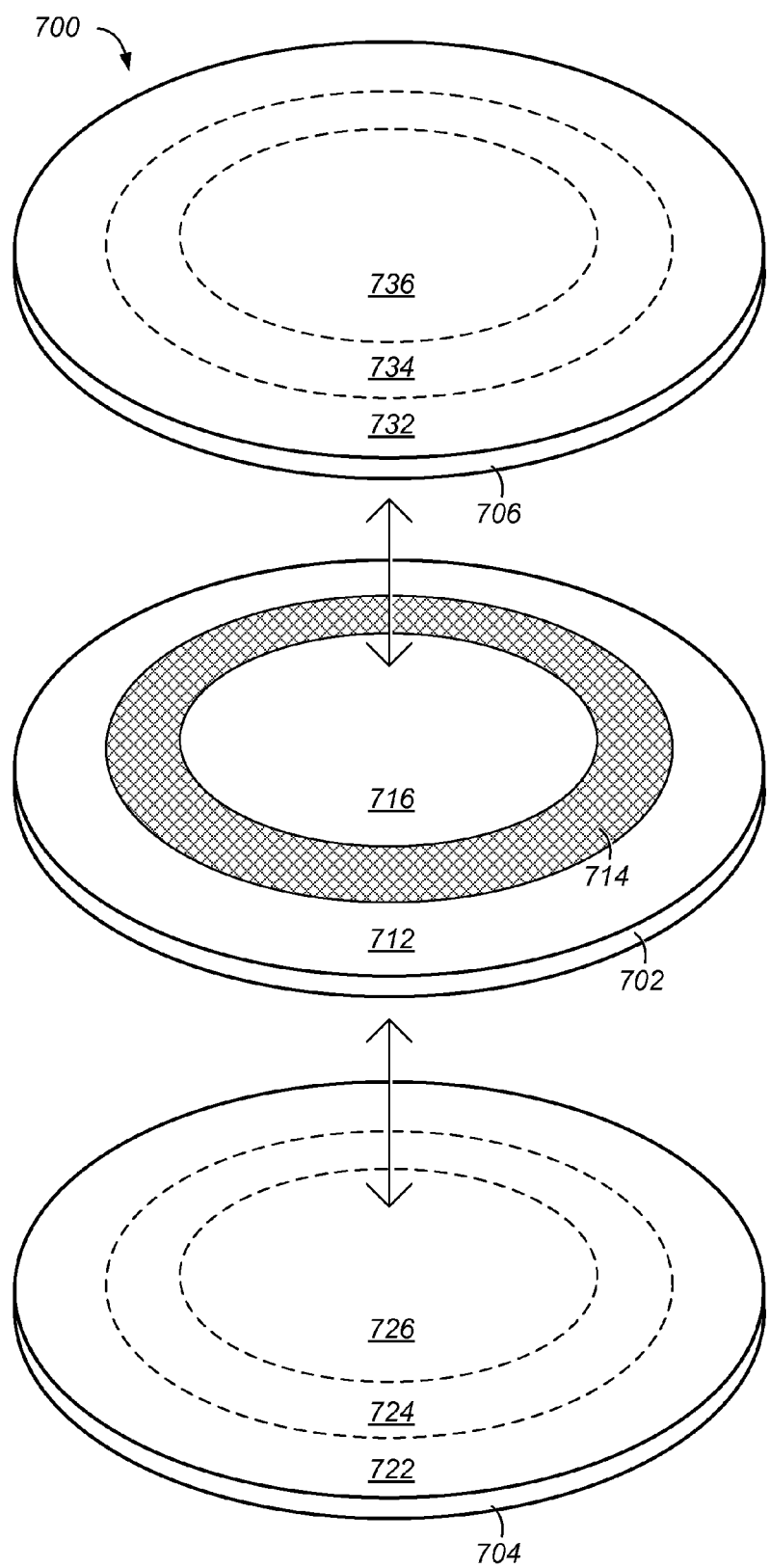
FIG. 7A-B illustrate a perspective exploded view of an ovoid-shaped EC device which is structured to switch between separate transmission patterns, in different regions of the EC film stack, based at least in part upon a sheet resistance pattern of one conductive layer, and is structured to selectively heat one or more regions of another conductive layer which corresponds to one or more of the EC film stack regions, according to some embodiments.
Figure 7B:
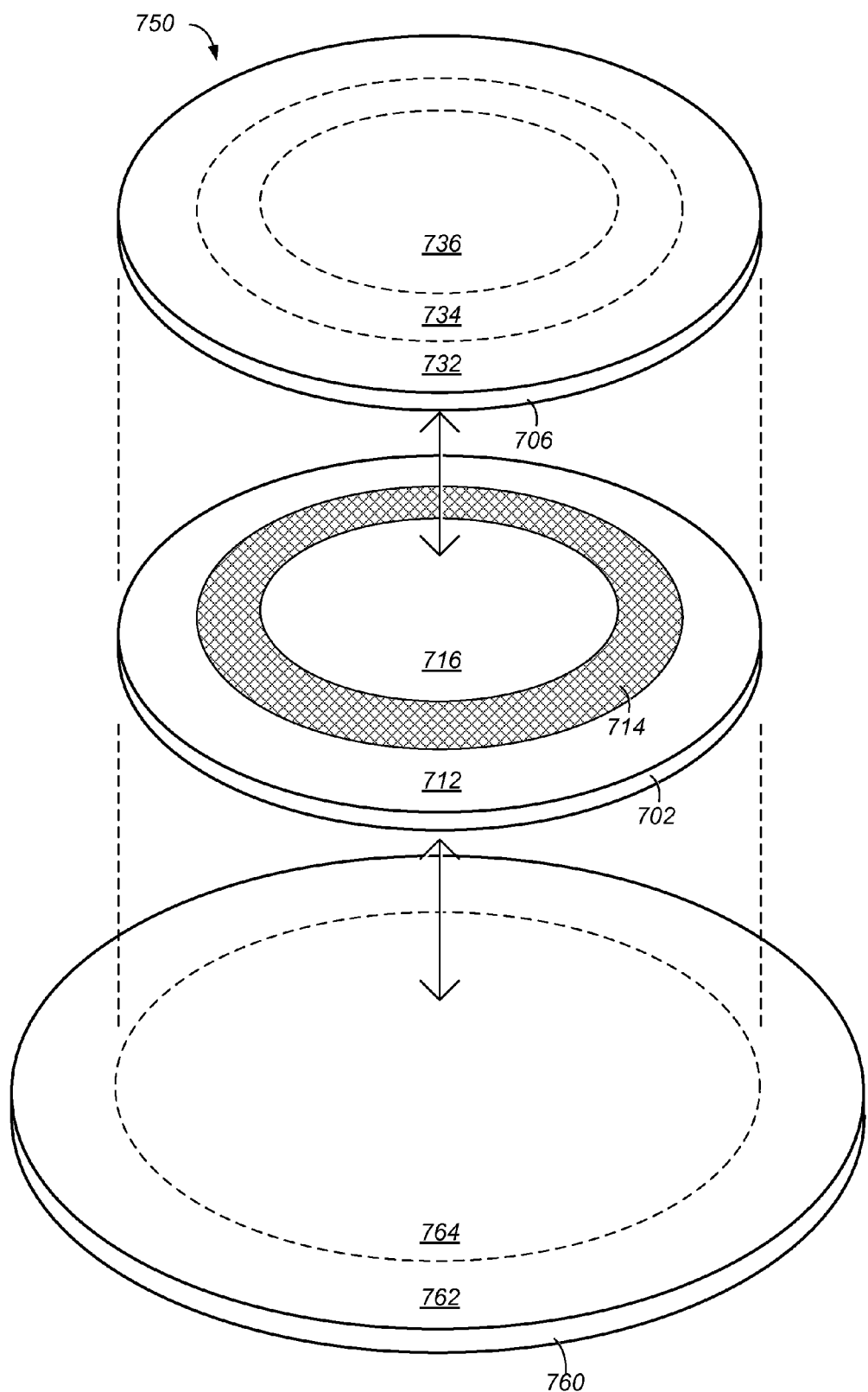

FIG. 7A-B illustrate a perspective exploded view of an ovoid-shaped EC device which is structured to switch between separate transmission patterns, in different regions of the EC film stack, based at least in part upon a sheet resistance pattern of one conductive layer, and is structured to selectively heat one or more regions of another conductive layer which corresponds to one or more of the EC film stack regions, according to some embodiments. EC device 700 includes at least an EC film stack 702, conductive layers 704, 706 on opposite sides of EC film stack 702, and separate EC regions 712-716 structured to switch transmission levels, so that region 714 is at a different transmission level than regions 712, 716. In some embodiments, EC device 700 is included in one or more portions of EC devices illustrated and disclosed elsewhere herein, including EC device 600 illustrated in FIG. 6.

In some embodiments, an EC device is structured to switch various different regions of the EC film stack ("EC regions") to different transmission levels. The capability of certain regions to switch transmission levels with at least a certain speed may be more important that similar capabilities of other regions. As a result, an EC device can be structured to prioritize heating of the certain regions, which can result in increased switching speed and uniformity of important regions, while at least partially mitigating expenditures of electrical power to heat other regions. Where one conductive layer is structured to enable the selective switching of various EC regions, another conductive layer can be structured to enable the selective heating of the various EC regions, via selective heating of various corresponding conductive layer regions.

In the illustrated embodiment of at least FIG. 7A, for example, EC device 700 includes an EC film stack 702 which is structured to switch to different transmission levels in different regions of the EC regions. For example, EC device 700 can be structured to switch region 714 to a lower transmission level than regions 712, 716 when an electrical potential difference is induced across stack 702 between conductive layers 704, 706. In some embodiments, such variation in transmission level switching across various EC regions is based at least in part upon variations in sheet resistance in one or more regions of a conductive layer coupled to the EC film stack. For example, as shown, top conductive layer 706 can include regions 732-736 which each correspond to a respective one of regions 712-716 of the stack which overlap with the respective regions 732-736. In the illustrated embodiment, region 734 can have a greater sheet resistance than regions 732, 736, so that when separate net voltages are applied to each of the separate conductive layers 704, 706, the electrical potential difference across region 714 is greater than the electrical potential difference across regions 712, 716. In some embodiments, and as shown, the other conductive layer, bottom conductive layer 704 can include corresponding regions 722-726, which can each correspond to a respective overlapping set of regions 712-716. Conductive layer 704 can be structured to heat at least the particular limited region 724, relative to regions 722, 726, to increase switching speed and uniformity in at least corresponding region 714. In some embodiments, the particular limited region in a conductive layer 704 encompasses multiple regions, including regions 714, 716. In some embodiments, the conductive layer 704 is structured to have a common sheet resistance throughout the various regions 722-726 of the layer, so that the layer 704 is structured to be uniformly heated throughout regions 722-726 to implement heating of various regions of layer 702.

In the above example, top conductive layer 706 is characterized as the conductive layer structured to cause various EC film stack regions to switch between different sets of transmission levels, to cause the EC film stack to switch between separate transmission patterns, while bottom conductive layer 704 is characterized as the conductive layer structured to be selectively heated, in one or more particular limited regions, to heat one or more regions of the EC film stack. It will be understood that the top conductive layer can be structured to be selectively heated in a particular limited region, bottom conductive layer can be structured cause the EC film stack to switch between separate transmission patterns, some combination thereof, etc.

In some embodiments, EC device 700 is structured to switch regions 712-716 to different transmission levels based at least in part upon variations in characteristics of the EC film stack 702, rather than variations in characteristics of the conductive layers 704, 706. For example, ion mobility in region 714 can be greater than that of regions 712, 716, thereby structuring region 714 to switch to a lower transmission level than regions 712, 716 which an electrical potential difference is induced across layer 702. In such embodiments, one or more of conductive layers 704, 706 can be structured to heat one or more regions, including one or more regions which correspond to one or more of the EC regions 712-716.

In some embodiments, region 724 is a particular annular EC region which includes a conductive layer region having a sheet resistance that is greater than that of at least conductive layer region 722. In addition, inner annular region 726 can include conductive layer regions with lower sheet resistances than that of region 724. As a result, and at least partially because electrodes can be coupled to region 722, current can be distributed through region 722 before being distributed through region 724, based at least in part upon the increased sheet resistance of the conductive layer in region 724 relative to region 722. As a result, current distribution from region 722 to region 724, and from region 724 to one or more of the inner regions 726, is increased in uniformity, relative to if region 724 included a conductive layer region having a sheet resistance that is less than that of region 722.

In one example, region 724 includes a conductive layer region with a sheet resistance of approximately 500 ohms/square mm, and region 722 includes a conductive layer region with a sheet resistance of approximately 50 ohms/square mm. The lower sheet resistance around the outer boundary of region 724 enables the low sheet resistance region 722 to distribute the current from electrodes more uniformly because the high resistance region 724 provides the current limit for the EC device 700. As a result, electrodes, which can include one or more bus bars, can be located further away from region 724 without impacting switching speed or uniformity. In addition, the potential difference in the device 700 will be across the high sheet resistance annular region 724, so the width of the voltage profile to the short can be adjusted by varying the dimensions of the annular region 724.

In some embodiments, one or more of the conductive layers in an EC device has a different shape than an EC film stack included in the EC device. As a result, in some embodiments, a conductive layer of an EC device, where the conductive layer is structured to heat a particular limited region of same, can be larger than the EC film stack of the EC device, so that the conductive layer extends beyond the boundaries of the EC film stack, and the EC film stack is coupled to a limited portion of the conductive layer. In some embodiments, the limited portion of the conductive layer to which the EC film stack is coupled can include some or all of the particular limited region of the conductive layer. As a result, heating one or more regions of an EC film stack, based at least in part upon heating one or more particular limited regions of a conductive layer, can include heating an entirety of the EC film stack, based at least in part upon heating one or more particular limited regions of a conductive layer. For example, in the illustrated embodiment of FIG. 7B, EC device 750 includes a conductive layer 760 which is structured to include a particular limited region 764 of the conductive layer 760 which is structured to be selectively heated relative to a remainder region 762 of the conductive layer 760, where conductive layer 760 extends beyond the boundaries of EC film stack 702, similar to the layer 120 in FIG. 1 extending beyond the EC film stack 102. As a result, the particular limited region 764 of conductive layer 760 may correspond (i.e., "overlap") with the entirety of EC film stack 702, while region 762 may extend beyond the edges of EC film stack 702 so that region 762 does not overlap with any portion of stack 702, so that the entirety of the EC film stack 702 is heated based at least in part upon selectively heating the particular limited region 764 of layer 760. As noted herein, in some embodiments, layer 760 is a layer which is included in EC device 700 and is separated from EC film stack 702 in EC device 700 by one or more layers, where the one or more layers can include layer 704 and one or more intermediate layers.

FIG. 8A-D illustrate an EC device which includes an electrical short of the EC film stack, between two conductive layers, according to some embodiments. EC device 800 includes at least an EC film stack 802, conductive layers 804, 806 on opposite sides of EC film stack 802, an electrical short 808 of the EC film stack 802, and separate sets of electrodes 810A-B, 812A-B coupled to the separate conductive layers. In some embodiments, EC device 800 is included in one or more portions of EC devices illustrated and disclosed elsewhere herein, including EC device 600 illustrated in FIG. 6, device 700 illustrated in FIG. 7A, device 750 illustrated in FIG. 7B, etc.

In some embodiments, an EC device includes an electrical short of at least the EC film stack. Such an electrical short may be included in an EC device for one or more various reasons, including enabling the EC device to switch to one or more transmission patterns when an electrical potential difference is induced across the EC film stack. In some embodiments, the electrical short, also referred herein as simply a "short", can be used to enable heating of one or more regions of the EC film stack. In particular, the short can be structured to maintain the temperature of one or more EC regions at an elevated temperature, based at least in part upon a current through the short, so that the one or more EC regions are structured to switch transmission levels more quickly than if the elevated temperature were not maintained. In some embodiments, the short is structured to minimize power dissipation by the current through the short, and heating of the EC film stack is enabled via heating of one or more regions of one or more conductive layers included in the EC device.

In the illustrated embodiment, EC device 800 includes an EC film stack 802, conductive layers 804, 806 on opposite sides of EC film stack 802, and an electrical short 808 through the EC film stack 802. As shown, some embodiments of EC device 800 can include a short 808 through the center of the EC film stack 802. Separate sets of electrodes 810A-B, 812A-B are coupled to the separate conductive layers. An electrical potential difference can be induced across the EC film stack 802, thereby causing the various regions 814-816 of the EC film stack 802 to switch transmission level, based at least in part upon application of different net voltages to the different conductive layers 804, 806 via the separate sets of electrodes coupled thereto. As noted above, one or more regions of one or more of the conductive layers can be heated based at least in part upon an electrical current induced through the given one or more conductive layers between two or more electrodes coupled to the same conductive layer. Such a current can be an alternating current, a direct current, etc.

In some embodiments, a presence of an electrical short in an EC film stack results in the EC film stack switching to one or more particular transmission patterns when an electrical potential difference is induced between the two conductive layers. For example, where an electrical potential difference is induced between conductive layers 804, 806, which can include a current through short 808, the EC film stack 802 can be switched from a uniform transmission level to a transmission pattern where the transmission level changes exponentially as a function of distance from the short 808 to the outer edge of the EC film stack 802. In some embodiments, one or more of the conductive layers includes different regions with different sheet resistances to structure the EC film stack to switch from a uniform transmission state to a particular pattern, relative to the short. For example, in the illustrated embodiment, conductive layer 804 includes regions 817A-B and 819A-B, where regions 817A-B include a greater sheet resistance than regions 819A-B. As a result, when various voltages are applied to the various electrodes 810A-B, 812A-B, the electrical potential difference across corresponding EC film stack regions 814A-B can be greater than across regions 816A-B, based at least in part upon the greater sheet resistance of the corresponding conductive layer regions 817A-B relative to regions 819A-B.

In some embodiments, an electrical short of an EC film stack can be structured to enable heating of at least a portion of the EC film stack. Such heating can be based at least in part upon current across the short between the conductive layers on opposite sides of the EC film stack. For example, in the illustrated embodiment, short 808 can be structured to enable sufficient current flow through short 808, when an electrical potential difference is induced between conductive layers 804, 806, to generate heat which can be transmitted to at least a portion of the EC film stack 802. Such a portion can include a region 814A-B of the EC film stack 802 which is proximate to the short 808, while a remainder region 816A-B of the stack 802 may not receive heating from short 808.

In some embodiments, an EC device which includes a short of the EC film stack is structured to enable two or more modes of heating of one or more portions of the EC device. In one mode of heating, an electrical potential difference is induced across one or more regions of one or more conductive layers included in the EC device to implement heating of one or more regions of the EC film stack, based at least in part upon heating the one or more regions of the conductive layer based on the electrical potential difference. Such conductive layers can be separate from the conductive layers on opposite sides of the EC film stack which includes the short. In another mode of heating, the short heats one or more regions of the EC film stack, based at least in part upon power dissipated by a current through the short. The two modes of heating can provide different amounts and types of heating. For example, a conductive layer can be heated to heat one or more regions of the EC film stack from an initial temperature to a target temperature. Such heating may be referred to herein as "initial heating". In another example, the short can be structured to transmit heat to one or more regions of the EC film stack, based at least in part upon power dissipated by a current through the short, to maintain a target temperature of the one or more EC film stack regions over a period of time. Such heating may be referred to here as "maintenance heating".

In some embodiments, the conductive layer through which an electrical potential difference is induced to implement initial heating is separated from the EC film stack by one or more intermediate layers, which can include an insulating layer, so that an electrical potential difference across the layer is not shorted by the electrical short of the EC film stack.

In some embodiments, an EC device includes a conductive layer structured for heating one or more particular regions, via power dissipated by the electrical short, and another conductive layer structured to cause the EC film stack to switch between separate transmission patterns. In some embodiments, one or more of the conductive layers is structured to limit the current through the electrical short to remain within one or more threshold limits. Such a conductive layer can include regions with different sheet resistances than corresponding (i.e., "overlapping") regions of a second conductive layer. For example, in the illustrated embodiment, conductive layer 806 can have a sheet resistance of approximately 100 ohms/square mm; when an electrical potential difference of approximately 3.6 volts is induced across the layer 802 and through the short 808, a current of approximately 35 milliamperes (mA) may flow in parallel with ("across") the layer 806, which may result in heating of one or more regions of layer 806 and can further result in heating the EC film stack regions 814-816 by approximately 20 Kelvin in approximately 0.5 seconds of elapsed time. In addition, the conductive layer 804 can include at least one region 817A-B which has a sheet resistance of approximately 1200 ohms/square mm; so that when the potential difference across layer 802 is approximately 3.6 volts, the current through the short 808 is restricted to approximately 4 mA, which can be sufficient to generate heat, through power dissipated by the 4 mA current, which can be transmitted radially through the EC film stack 802 from short 808. Such heating can maintain the elevated temperature of one or more regions of the EC film stack 802 when initial heating is discontinued. In some embodiments, the region 817A-B which has a greater sheet resistance than one or more regions of layer 806 also has a greater sheet resistance than regions 819A-B, and region 817A-B can be structured to correspond to a particular transmission pattern to which the EC film stack can be switched. As a result, the conductive layer 806 can be structured to be heated, in one or more particular limited regions, and conductive layer 804 can be structured, via varying sheet resistance in various conductive layer regions 817, 819, to manage current flow through the electrical short 808 to remain within one or more thresholds associated with maintenance heating via power dissipated by current through the short. In addition, the layer 806 can be structured to manage the separate transmission patterns between which the EC film stack switches when a potential difference is induced across the EC film stack 802, such that different EC film stack regions 816, 814 switch to different transmission levels. In some embodiments, one conductive layer is structured to manage current flow through an electrical short of an EC film stack, independently of heating of one or more regions of another conductive layer.

In some embodiments, the short 808 is structured to minimize power dissipated by current through the short, which can optimize switching performance by minimizing energy loss and maintaining a transmission pattern of the EC film stack. In some embodiments, the short 808 is structured so that the dissipated power provides sufficient heat to maintain a target temperature of at least a portion of the EC film stack while an electrical potential difference is induced across the layer 802 to maintain a switched state of the EC film stack 802. As a result, where the short 808 is structured to maintain a target temperature of the EC film stack during switching, initial heating by one or more conductive layers, heat sources, etc. can be discontinued during switching operations, and the current loss through the short during switching operations can maintain the target temperature achieved via the initial heating, thereby conserving the expenditure of electrical power for the EC device by using power dissipated by the current through the short to maintain the EC film stack temperature and forgo the need to continue heating of a conductive layer region during switching operations.

In some embodiments, separate conductive layers in an EC device are separately structured based on switching performance or heating performance. For example, layer 804 can be structured to selectively switch various regions of the EC film stack 802 to different transmission levels, based at least in part upon various corresponding regions 817A-B, 819A-B of the layer 804 having different sheet resistances, so that an electrical potential difference across the corresponding regions of the EC film stack can vary based at least in part upon the varying sheet resistances of the conductive layer. One of such regions of layer 804 can include an annular region which has a greater sheet resistance than other regions. Such an annular high-resistance region can at least partially mitigate switching uniformity issues caused by sheet resistance mismatches between the various regions of the conductive layers 804. 806. In addition, layer 806 can be structured to include a different set of regions, some regions having different sheet resistance than others, to structure the layer 806 to selectively heat a particular limited portion of the conductive layer. In some embodiments, layer 806 includes uniform sheet resistance throughout the layer.

In some embodiments, an EC device is restricted to two electrodes. The separate electrodes can be coupled to separate conductive layers. For example, device 800 can be restricted to electrodes 810B and 812B, where separate individual electrodes are coupled to separate layers 804, 806.

In some embodiments, the electrodes coupled to separate layers of device 800 are coupled to a set of one or more power sources which can direct an AC signal across the short 808 of the device to induce heating of one or more portions of the device. In some embodiments, the electrodes are coupled to a set of one or more power sources which can direct a DC signal through the device to induce transmission state switching of one or more portions of the device 800. In some embodiments, the electrodes are coupled to a set of one or more power sources which can concurrently direct a DC signal and an AC signal through one or more portions of the device 800, so that the device can be heated via the AC signal concurrently with the transmission state of one or more portions of the device 800 being switched via the DC signal.

At least one of the power sources may include both DC and AC components. As a result, at least one of the power sources can induce a particular voltage, in each electrode of a set of electrodes, which switches polarity at a sufficiently high frequency to preclude the EC film stack 802 from switching transmission state based on the AC electrical potential difference induced between electrodes and across short 808. Such an alternating electrical potential difference across short 808 can result in heating of one or more regions of layer 802, based at least in part upon one or more characteristics of the layer, including resistivity of one or more material species included in the layer, geometric structure of the layer, arrangement of the electrodes in the layer, etc. In addition, the net voltage at a conductive layer, based at least in part upon the high-frequency alternating current, can be a constant voltage and the net current flow across the layer can be negligible.

The set of one or more power sources coupled to device 800 can induce a constant net potential difference between the separate electrodes coupled to the one or more power sources, resulting in an electrical potential difference between the separate conductive layers to which each separate set of electrodes is coupled, which can cause one or more regions of the EC film stack to switch between separate transmission patterns.

While the net voltage applied to the electrodes, and thus one or more of the conductive layers 804, 806, is a net constant voltage, at least one power source may further induce an alternating current through one or more layers via switching the polarity of the voltage applied to the set of electrodes coupled to the layer. The frequency of switching, as noted above, can be sufficiently great to preclude the EC film stack 802 from responding to the instantaneous electrical potential difference across the layer. As a result, the EC film stack 802 responds to the net voltage of the one or more layers, which is a constant net voltage, although the instantaneous electrical potential difference varies according to the alternating current signal.

In some embodiments, an AC signal can be applied across the short 808 included in device 800, and the frequency of the AC signal can be sufficiently great to preclude transmission state switching in layer 802 as a result of the AC signal. In some embodiments, a sufficiently great frequency of the AC signal can comprise a frequency which exceeds 100 Hz. As a result, one or more portions of the device 800 can be heated as a result of the AC signal across the short 808 which has a sufficiently great frequency to mitigate transmission state switching, while a net voltage difference between layers 804, 806 as a result of a DC signal can result in a transmission state being controlled, including being switched, maintained, etc., as a result of the DC signal concurrently with the AC signal passing through the short 808.

In some embodiments, an EC device includes a resonant circuit, also referred to herein as an LC circuit, which is electrically coupled to an AC circuit through the EC device which is configured to heat at least a portion of the device. The LC circuit, which can include an inductor electrically coupled to a capacitor in a circuit, can be included in the AC electrical circuit via which an AC signal can be passed through at least a portion of the EC device. The LC circuit can "tune" the AC circuit frequency to a resonance frequency which results in an increase in the instantaneous voltage, and thus the current, induced by the AC current (also referred to herein as an AC signal) through at least a portion of the EC device. As a result of the increase in instantaneous voltage of the AC signal, the LC circuit can cause heating of the EC device to be augmented.

In some embodiments, short 808 is structured for one of various heating modes. For example, where EC device 808 is structured to switch occasionally, the EC device can be structured to implement initial heating only. As a result, the short can be structured to optimize switching performance and minimize power dissipation by a current through the short. In another example, where EC device 808 is structured to switch often, or on short notice, the EC device can be structured to implement at least maintenance heating. As a result, the short 808 can be structured to provide at least some predetermined amount of power dissipated by a current through the short 808 to heat one or more regions of the EC film stack 802, including regions 814A-B which are proximate to the short 808, between switching of the EC film stack between separate transmission patterns.

In some embodiments, an EC device which does not include a short includes separate conductive layers each structured to implement a separate one of initial heating or maintenance heating. For example, EC device 800, where short 808 is absent, can include a conductive layer 804 structured to provide initial heating based at least in part upon an electrical potential between electrodes 810A-B to heat at least some of EC film stack 802 to a target temperature, while layer 806 can be structured to provide maintenance heating to maintain the target temperature of EC film stack 802, based at least in part upon an electrical potential difference between electrodes 812A-B. In some embodiments, initial heating can be implemented with various electrode designs. For example, the current used for heating can be DC or AC.

In some embodiments, the EC device 800 includes a layer configured to heat one or more portions of the EC device. The layer can be referred to herein as a heating layer. In some embodiments, the heating layer comprises a conductive layer, which can be separate from a conductive layer, of the EC device, which is configured to facilitate transmission state switching.

Figure 8A:
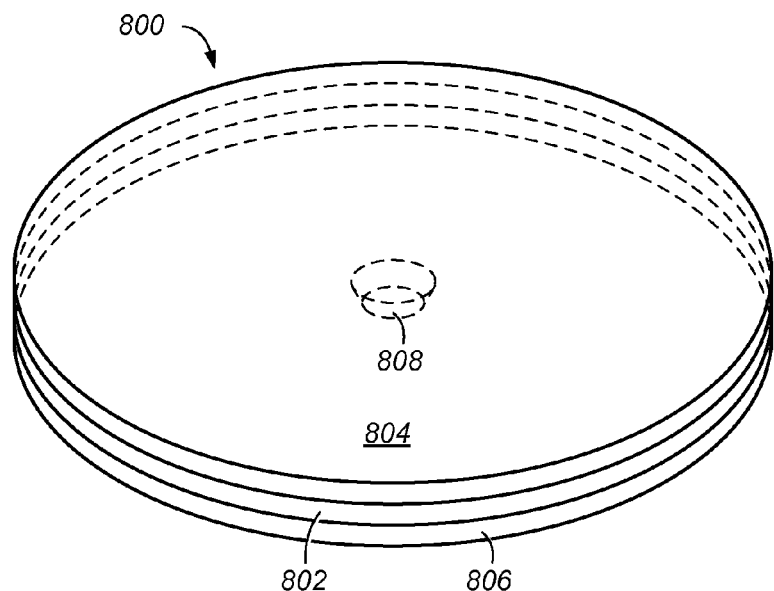
FIG. 8A-D illustrate an EC device which includes an electrical short of the EC film stack, between two conductive layers, according to some embodiments.
Figure 8B:
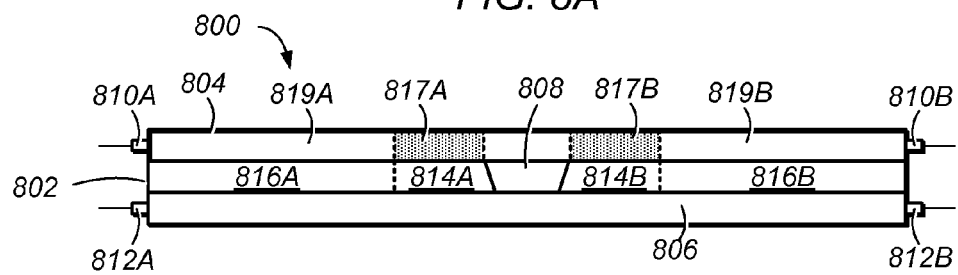
Figure 8C:
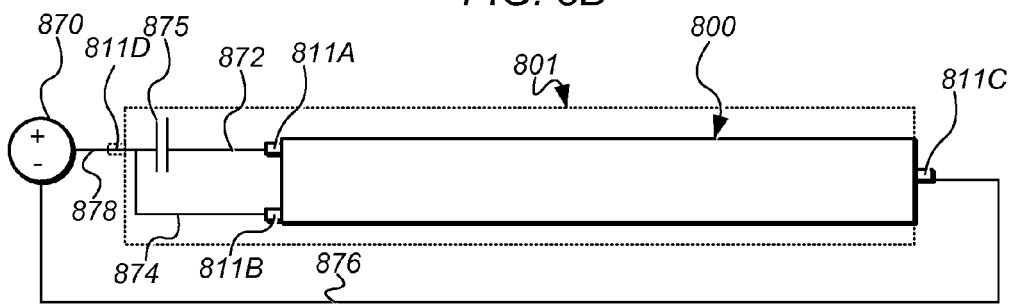

The heating layer can be electrically coupled to a power supply via at least one capacitor. As shown in FIG. 8C, an electrode 811A included in EC device 800 can be electrically coupled to a power source 870 via a circuit 872 which includes a capacitor 875. The capacitor can preclude a DC signal, originating from power source 870, from passing through the circuit 872 to electrode 811A, while an AC signal generated by source 870 can pass through circuit 872 to a portion of the EC device 800, which can include the heating layer, to which the electrode 811A is coupled. As a result, an AC signal generated at source 870, which comprises a frequency which is sufficiently great to facilitate heating of one or more portions of the EC device 800, can be passed through circuit 872 and electrode, while the DC signal can be precluded, by capacitor 875, from passing through the circuit 872 and electrode 811A, while the DC signal can pass into at least one portion of the device 800, via parallel circuit 874 and electrode 811B, which can be separate from the portion of the device through which the AC signal passes via circuit 872 and electrode 811A. As a result, the DC signal can be precluded from affecting the heating layer through which the AC signal passes.

The circuit through which the DC signal passes can include an electrical short 808 in the device 800. As a result, the EC device 800 can include a high-resistance circuit, based on the resistance through the short 808, through which the DC signal can pass via electrodes 811B, 811D. The circuit through which the AC signal passes in the device 800 can be a relatively low-resistance circuit, relative to the circuit through which the DC signal passes, so that the capacitor dissipates power when the AC signal is generated by source 870. The resistance through the short 808 can be increased, such that the electrical power utilized to generate the DC signal which switches transmission pattern can be reduced.

In some embodiments, the capacitor 875, circuits 872, 874, and EC device 800 are included in a common device 801 to which the source 870 is coupled via circuits 876, 878 and electrodes 811C-D, such that the source 870 is coupled to the device 801 via two electrodes 811C, 811D, circuits 874, 872 can be coupled in parallel with source 870 via circuit 878 and electrode 811D, and capacitor 875 can preclude a DC signal transmitted from source 870 via circuit 878 and electrode 811D from passing through circuit 872 and electrode 811A into a particular portion of the EC device 800.

Figure 8D:
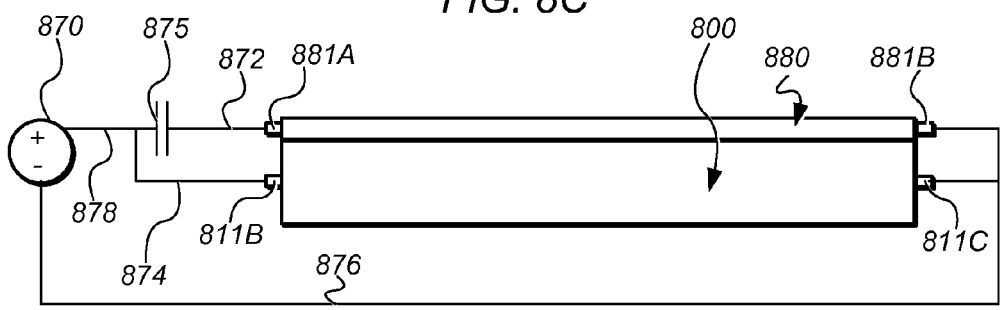

In some embodiments, the EC device 800 is coupled to a separate component 880 which is configured to heat one or more portions of the EC device 800. The component 880 can be referred to as a heating element and can be electrically coupled in parallel with EC device 800, as shown in FIG. 8D. The EC device 800 can be configured to minimize current through an electrical short 808 in the device. The heating element 880 can comprise an additional conductive layer which can extend along one or more sides of the EC device 800, including one or more sides of a substrate to which the EC device 800 is coupled. As shown in FIG. 8D, the heating element 880 can be coupled to a capacitor 875, via electrode 881A and circuit 872, and the element 880 can be electrically coupled in parallel with the EC device 800, via electrodes 881A-B and circuits 876, 878, 872, 874, to power source 870. Heating of one or more portions of the EC device 800, via an AC signal through the heating element 880, can occur when the AC signal is generated by the power source 870 and passed through the element 880. Transmission state switching in the EC device can occur when a DC signal is generated, concurrently with the AC signal, independently of the AC signal, etc., and the DC signal passes through the device 800 and is precluded from passing through the element 880 by capacitor 875.

In the illustrated embodiments of at least FIG. 6, the electrodes are illustrated as symmetrical sets of busbars on each conductive layer, where the electrodes are uniformly spaced from at least one particular EC region 614. It will be understood that, in some embodiments, the electrodes are asymmetrical in structure and arrangement, and the electrodes can be non-uniformly arranged relative to one or more EC regions. For example, a set of electrodes coupled to a conductive layer can be odd in number (e.g., three electrodes). Where an odd number of electrodes (e.g., busbars) are coupled to a conductive layer, uniform heating of one or more regions of the conductive layer can be achieved, based at least in part upon the electrodes in the set being structured to switch between different polarities so that current flow through the layer is uniform. In another example, some electrodes are asymmetrical in shape.

Figure 9A:
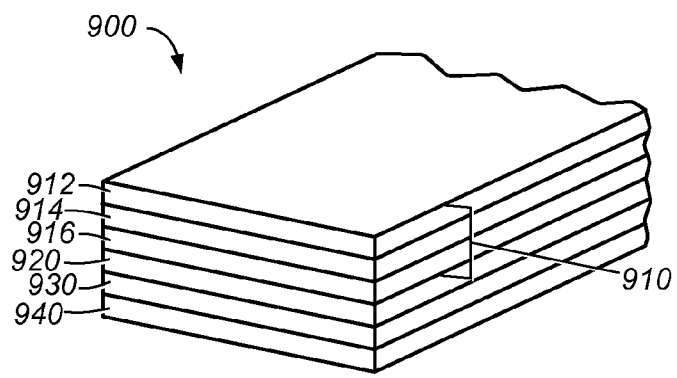
FIG. 9A-C illustrate EC devices which includes an EC film stack, adjacent conductive layers on opposite sides of the EC film stack, and a separate conductive layer which is coupled to one of the adjacent conductive layers via an insulating layer, according to some embodiments.
Figure 9B:
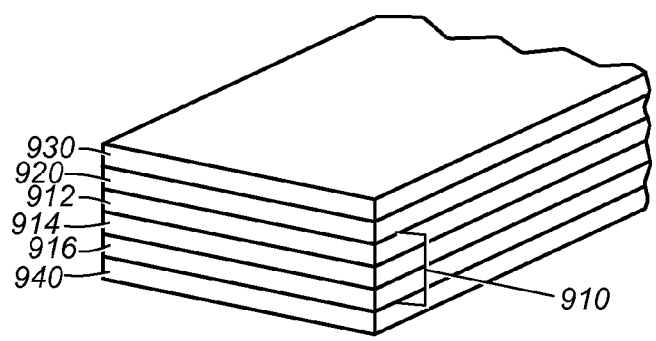
Figure 9C:
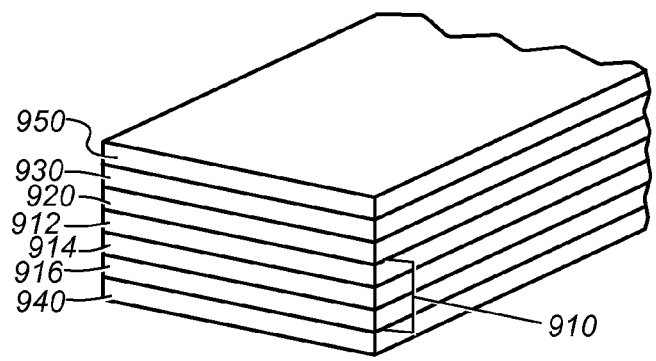

FIG. 9A-C illustrate EC devices which includes an EC film stack, adjacent conductive layers on opposite sides of the EC film stack, and a separate conductive layer which is coupled to one of the adjacent conductive layers via an insulating layer, according to some embodiments. EC device 900 includes an EC stack 910 having an EC film stack 914 and conductive layers 912, 916 on opposite sides of the EC film stack, with the EC stack coupled to one or more substrates 940, 950 and a separate conductive layer 930 via at least one intermediate layer 920. In some embodiments, EC device 900 is included in one or more portions of EC devices illustrated and disclosed elsewhere herein, including EC device 200 illustrated in FIG. 2, EC device 600 illustrated in FIG. 6, etc. In some embodiments, intermediate layer 920 includes one or more insulating layers, bonding layers, encapsulation layers, anti-reflective layers, infrared cut-off filter layers, obscuration layers, some combination thereof, etc. In some embodiments, EC device 900 includes multiple intermediate layers 920 between two or more of the heating layer, substrate, EC stack, some combination thereof, etc.

In some embodiments, an EC device is structured to heat one or more regions of the EC films stack, based at least in part upon selective heating of one or more particular limited regions of a conductive layer which is separated from the EC stack by one or more intermediate layers. Such a conductive layer, also referred to herein as a "separate" conductive layer, "heating layer, etc., can be structured to generate heat, in one or more regions, which is transmitted to the EC stack to heat one or more regions of the EC film stack, via one or more intermediate layers.

As shown in the illustrated embodiments, an EC device can include various arrangements of layers, including the EC stack, heating layer, intermediate layer, substrate, etc. For example, in FIG. 9A, the heating layer 930 is coupled to substrate 940, intermediate layer 920 is coupled to heating layer 930 on an opposite side from substrate 940, and EC stack 910 is coupled to the intermediate layer 920. It will be understood that, in some embodiments where the heating layer 930 is located between the EC stack 910 and a substrate, such as illustrated in FIG. 9A, one or more intermediate layers can be located between the heating layer 930 and the substrate 940. In some embodiments, the heating layer 930 is located on an opposite side of the substrate 940 from the EC stack 910. In some embodiments, as noted herein, the substrate is the heating layer, such that a heating layer separate from the substrate is absent from the EC device. Conversely, in FIG. 9B, the EC stack 910 is coupled to the substrate 940, intermediate layer 920 is coupled to the EC stack 910, and heating layer 930 is coupled to the intermediate layer 920. As referred to herein, coupling of layers can include depositing one layer on top of another. As shown in FIG. 9C, the various layers 910-930 can be located between two or more substrates. In particular FIG. 9C shows EC stack 910 coupled to substrate 940, intermediate layer 920 coupled to EC stack 910, heating layer 930 coupled to intermediate layer 920, and substrate 950 coupled to heating layer 930.

In some embodiments, a conductive layer which includes a particular limited region that is structured to be heated, relative to a remainder region of the conductive layer, can include a substrate layer of an EC device. For example, in FIG. 9B, heating layer 930 can comprise a substrate which is includes a particular limited region structured to be heated, relative to a remainder region of the substrate. In another example, FIG. 9A, the heating layer of an EC device 900 can be the substrate 940, where the substrate 940 is structured to include a particular limited region which is structured to be heated, relative to a remainder region of the substrate, and where the separate heating layer 930 is absent from EC device 900. A substrate, as referred to herein, can comprise one or more of various materials. In some embodiments, a substrate includes one or more of a transparent or reflective material, including a material which can reflect at least one wavelength of the electromagnetic spectrum. The substrate can include one or more various transparent materials, including one or more glasses, crystalline materials, polymer materials, etc. Crystalline materials can include Sapphire, Germanium, silicon, etc. Polymer materials can include PC, PMMA, PET, etc. A substrate included in an EC device, including a substrate structured to be selectively heated, in one or more particular limited regions relative to one or more remainder regions thereof, can include different glasses with different conductivity in different regions thereof. For example, a substrate can include one or more of borosilicate glass, alumino-borosilicate glass, some combination thereof, etc. A substrate can have one or more various thicknesses. For example, a substrate can have one or more thicknesses between 1 to several hundreds of microns thick, inclusively. A thickness of a portion of an EC device layer, including a substrate layer, can be associated with one or more of a conductivity, resistance, etc. associated with the portion. A thickness of a layer can vary across the layer to structure the layer to have conductivity, resistance, etc., which varies across the layer in correspondence with the varying thickness. A substrate can include one or more thermally tempered materials, chemically tempered materials, etc. For example, a substrate can include GORILLA GLASS™. A substrate can include materials having one or more various thermal expansion coefficients. A substrate can include one or more of an IGU, TGU, laminate, monolithic substrate, etc. The substrate can face out of a camera device in which an EC device is included, toward subjects to be imaged. In some embodiments, the surface of substrate which is opposite the surface on which the EC device is included is exposed to an ambient environment external to the camera device. EC device can include various layers, including one or more conductive layers, EC stack layers, etc., as discussed elsewhere in the disclosure.

II. Controlled Electrochromic Heating with Substrate

Figure 10:
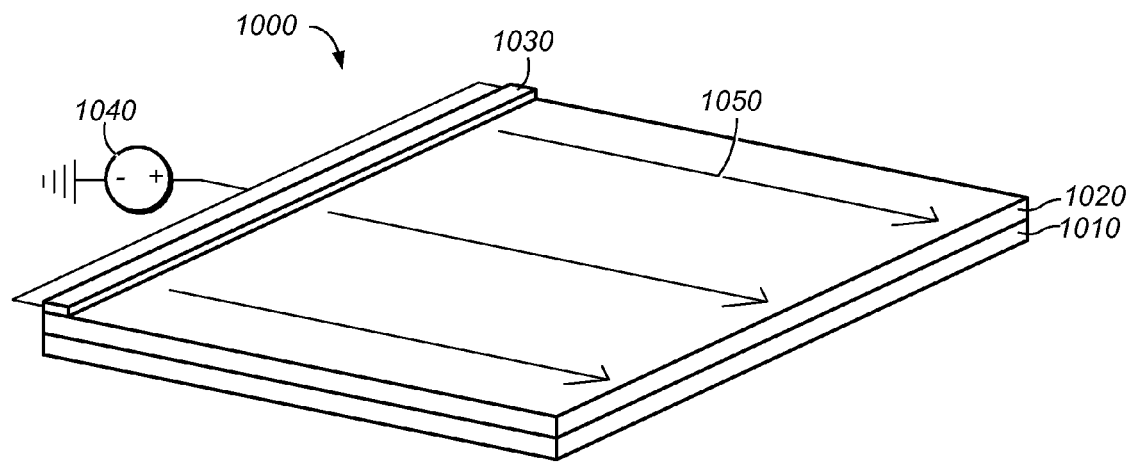
FIG. 10 illustrates an EC device which includes an EC film stack, adjacent conductive layers on opposite sides of the EC film stack, and a substrate which is coupled to a heat source and is structured to heat some or all of the EC film stack, according to some embodiments.

FIG. 10 illustrates an EC device which includes an EC film stack, adjacent conductive layers on opposite sides of the EC film stack, and a substrate which is coupled to a heat source and is structured to heat some or all of the EC film stack, according to some embodiments. EC device 1000 includes an EC stack 1010, a thermally-conductive layer 1020 structured to uniformly distribute received heat across an adjacent surface of the EC stack 1010, and a heat source 1030 structured to discharge heat 1050 into the thermally conductive layer 1030 to be uniformly distributed. EC device 1000 can be included in one or more various EC devices illustrated elsewhere herein, including the EC device 900, illustrated in FIG. 9.

In some embodiments, an EC device includes a heating layer, which is separate from an EC stack, which includes a thermally-conductive layer structured to uniformly distribute heat across an adjacent surface off the EC stack, including an adjacent surface of a conductive layer included in the EC stack. The thermally-conductive layer, which can include a substrate, can receive and uniformly distribute heat received from one or more various heat sources. In some embodiments, where the EC device 1000 is included in a device which includes a heat source, the EC device can be thermally coupled to the heat source, via one or more bonding layers, thermal conductive layers, etc. to structure the device to route heat from the heat source to the layer 1020. In some embodiments, a dedicated heat source is coupled to the layer 1020, where the heat source is structured to discharge heat in to the layer 1020 based at least in part upon electrical power supplied to the heat source. Such a heat source can include a thermoelectric heat transfer device, heat pump device, etc.

In the illustrated embodiment, for example, EC device 1000 includes a thermoelectric heat transfer device 1030 which is structured to receive an electrical power current via an electrical power source 1040, where the device 1030 is structured to discharge heat, based at least in part upon a current supplied by the source 1040. In the illustrated embodiment, device 1030 is coupled to layer 1020 and is structured to discharge heat into layer 1020, where layer 1020 can uniformly distribute 1050 said heat throughout the layer 1020 to uniformly transmit the heat 1050 to the EC stack 1010.

In some embodiments, EC device 1000 includes one or more intermediate layers between the thermally-conductive layer and the EC stack. As noted above, such intermediate layers can include insulating layers, bonding layers, anti-reflective layers, infrared cut-off filter layers, obscuration layers, some combination thereof, etc.

III. Electrochromic Device Heating Control System

Figures 11A, 11B:
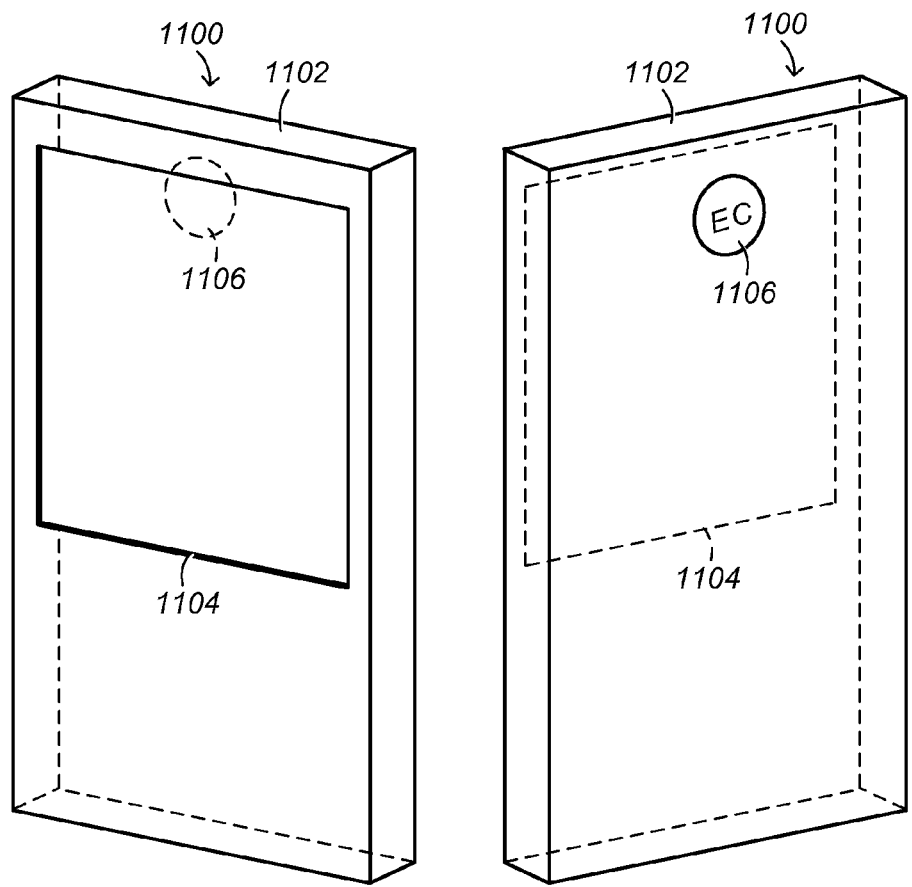
FIG. 11A-C illustrate a end-user device which includes an EC device and a control system structured to control heating of the EC device, based at least in part upon trigger events associated with end-user interactions with the end-user device, according to some embodiments.
Figure 11C:
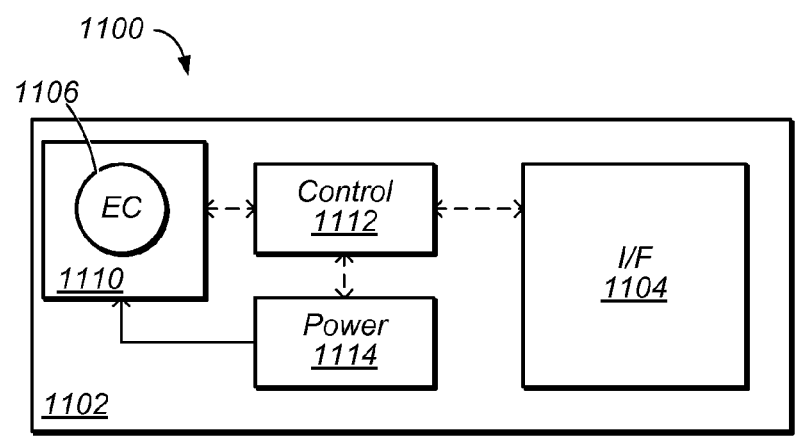

FIG. 11A-C illustrate an end-user device which includes an EC device and a control system structured to control heating of the EC device, based at least in part upon trigger events associated with end-user interactions with the end-user device, according to some embodiments.

In some embodiments, heating of one or more regions of an EC device is controlled via various methods and systems. Such methods and systems can include manually-controlled application of voltage to various electrodes of the EC device, where an operator manually adjusts one or more components to manually adjust the voltage applied to the electrodes. Such methods and systems can include automatically-controlled application of voltage to various electrodes of the EC device. Such automatic control can include a control system, which can be implemented by one or more computer systems, which controls determination of voltages to apply to EC device electrodes, determining whether to apply voltages to EC device electrodes, generating command signals to apply or cease applying voltages to various electrodes, some combination thereof, etc.

In some embodiments, an EC device is included in an end-user device and is structured to selectively switch transmission patterns based at least in part upon one or more trigger events associated with the end-user device. The end-user device can include a control system, which can be implemented by one or more computer systems and can selectively control power supplied to one or more portions of the EC device to control transmission pattern switching, based at least in part upon one or more trigger events. Trigger events can include certain user-initiated interactions with the end-user device, one or more determinations made regarding the state of one or more portions of the end-user device, etc.

In some embodiments, the end-user device includes a control system structured to selectively control heating of one or more regions of the EC device in the end-user device, based at least in part upon one or more trigger events. For example, where the EC device is included in a camera aperture of a camera device in an end-user device, the control system can selectively control heating of the EC device based at least in part upon a trigger event indicating that usage of the camera device is imminent, that an image is to be captured by the camera device, etc.

FIG. 11A-B illustrate exterior perspective views of an end-user device 1100 which includes a user interface 1104 and an EC device 1106 in a device housing 1102. The end user device 1100, in some embodiments, comprises one or more computer systems, including a smartphone device, camera device, tablet computing device, laptop, etc. The user interface 1104 can include a graphical user interface display, including a touchscreen display.

In some embodiments, end-user device 1100 includes a camera device which an end user can control via interaction with the interface 1106, where the EC device 1106 is included in a camera aperture of the camera device and can be switched between transmission states to control camera device operations and captured image quality. In addition, the EC device 1106 can be selectively heated, based on various trigger events associated with the camera device. Trigger events can include ambient temperature being above or below certain threshold temperatures, a user interacting with interface 1104 to activate the camera device (e.g., activate camera mode), a user interacting with interface 1104 to capture an image via the camera device, etc.

FIG. 11C illustrates a schematic diagram of the end-user device 1100, including the interface device 1104, and the EC device 1106 included in the camera device 1110. The end-user device 1100 further includes a control system 1112, which can be implemented at least in part by one or more computer systems. The end-user device 1100 further includes a power supply 1108, which can include a battery, a power feed from an external power source, some combination thereof, etc., where the power supply 1108 is structured to distribute electrical power to at least the EC device 1104 in the camera device 1110. As shown, control system 112 can interact with one or more portions of the interface 1104, the power supply 1114, and the camera device 1110. For example, the control system 112 can receive EC device temperature data, indicating a temperature of at least a portion of the EC film stack in the EC device 1106, from the camera device 1110. In addition, control device 1112 can command the camera device 1110 to capture an image, and can capture one or more of the camera device or power supply to switch transmission patterns of the EC device 1106, heat one or more regions of the EC device 1106, etc. The control system 1112 can, in some embodiments, receive commands from a user via the interface 1104, including a command to activate the camera device 1110, capture an image via the camera device 1110, etc. Based on such commands, data from the camera device 1110, etc., the control system 1112 can determine that a trigger event has occurred, where the control system 1112 responds to such a determination by commanding one or more of the camera device 1110, power supply 1114, etc. to selectively heat one or more regions of the EC device. Such a command can include a command to apply voltage to one or more electrodes coupled to the EC device 1106 to induce an electrical potential difference across a conductive layer, apply voltage to one or more portions of a heat source to supply heat to one or more layers of the EC device 1106, etc.

Figure 12:
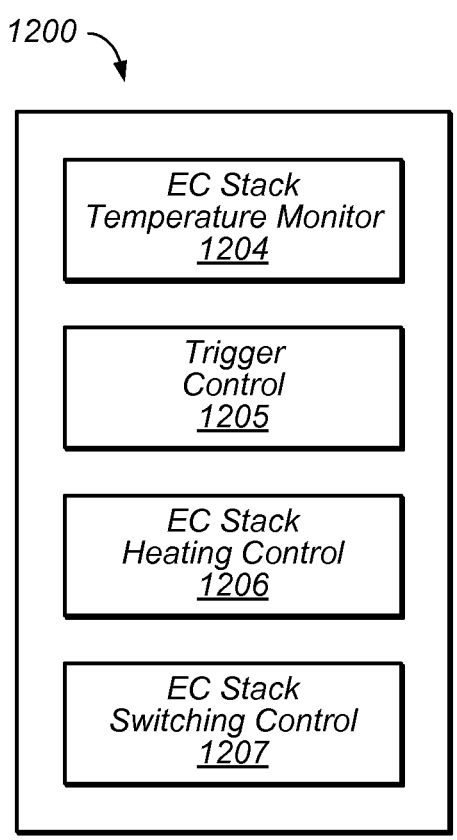
FIG. 12 illustrates a control system which is structured to control selective heating of an EC device, based at least in part upon a determination of one or more trigger events, according to some embodiments.

FIG. 12 illustrates a control system which is structured to control selective heating of an EC device, based at least in part upon a determination of one or more trigger events, according to some embodiments. The control system 1200 can be included in one or more of the control systems disclosed herein, including control system 1112 illustrated in FIG. 12. The control system 1200 can be implemented by one or more computer systems, including the computer system illustrated in FIG. 13. Control system 1200 includes various modules structured to implement various aspects of the control system 1200.

Control system 1200 includes an EC stack temperature monitor module 1204. The monitor module 1204 can monitor the temperature of one or more portions of an EC stack of an EC device, including a temperature of one or more regions of the EC film stack. Such temperature monitoring can be based at least in part upon temperature data received from one or more components coupled to the EC device. For example, temperature of an EC film stack can be determined based at least in part upon electrical current data, including current loss, calculated resistivity, etc. In another example, temperature of an EC film stack can be determined based at least in part upon temperature data received from a thermocouple device coupled to the EC device.

Control system 1200 includes a trigger control monitor 1205. The trigger control module 1205 can determine whether or not one or more particular predetermined trigger events has occurred, relative to the EC device, a device in which the EC device is included, etc. In one example, a trigger event occurrence includes a determination that the temperature of one or more regions of the EC device is less than a threshold temperature value. In another example, a trigger event occurrence includes a determination that a particular user command is received from a user interface, including a command, based at least in part upon a user-initiated interaction with the interface, for a device which comprises the EC device to perform one or more particular operations. For example, in an embodiment where the EC device is included in a camera device, a trigger event occurrence can include a determination that a user has commanded the camera device to be activated, via interaction with a user interface.

Control system 1200 includes an EC stack heating control module 1206. Module 1206 can determine a particular set of voltages to be applied to various electrodes coupled to the EC device, at one or more given times, to heat one or more regions of the EC device so that one or more regions of the EC device are heated to one or more particular target temperatures, maintained at one or more target temperatures, etc. The control module 1206 can determine whether to heat the EC device via one or more various heating modes, including initial heating, maintenance heating, etc. The control module 1206 can generate command signals to one or more external devices, including the EC device, a power supply electrically coupled to the EC device, etc., based at least in part upon trigger event determinations at the trigger control module 1205.

Control system 1200 includes an EC stack switching control module 1207. Module 1207 can determine a particular set of voltages to be applied to various electrodes coupled to the EC device, at one or more given times, to switch one or more regions of the EC device between separate transmission patterns. The control module 1207 can generate command signals to one or more external devices, including the EC device, a power supply electrically coupled to the EC device, etc., based at least in part upon trigger event determinations at the trigger control module 1205.

Figure 13:
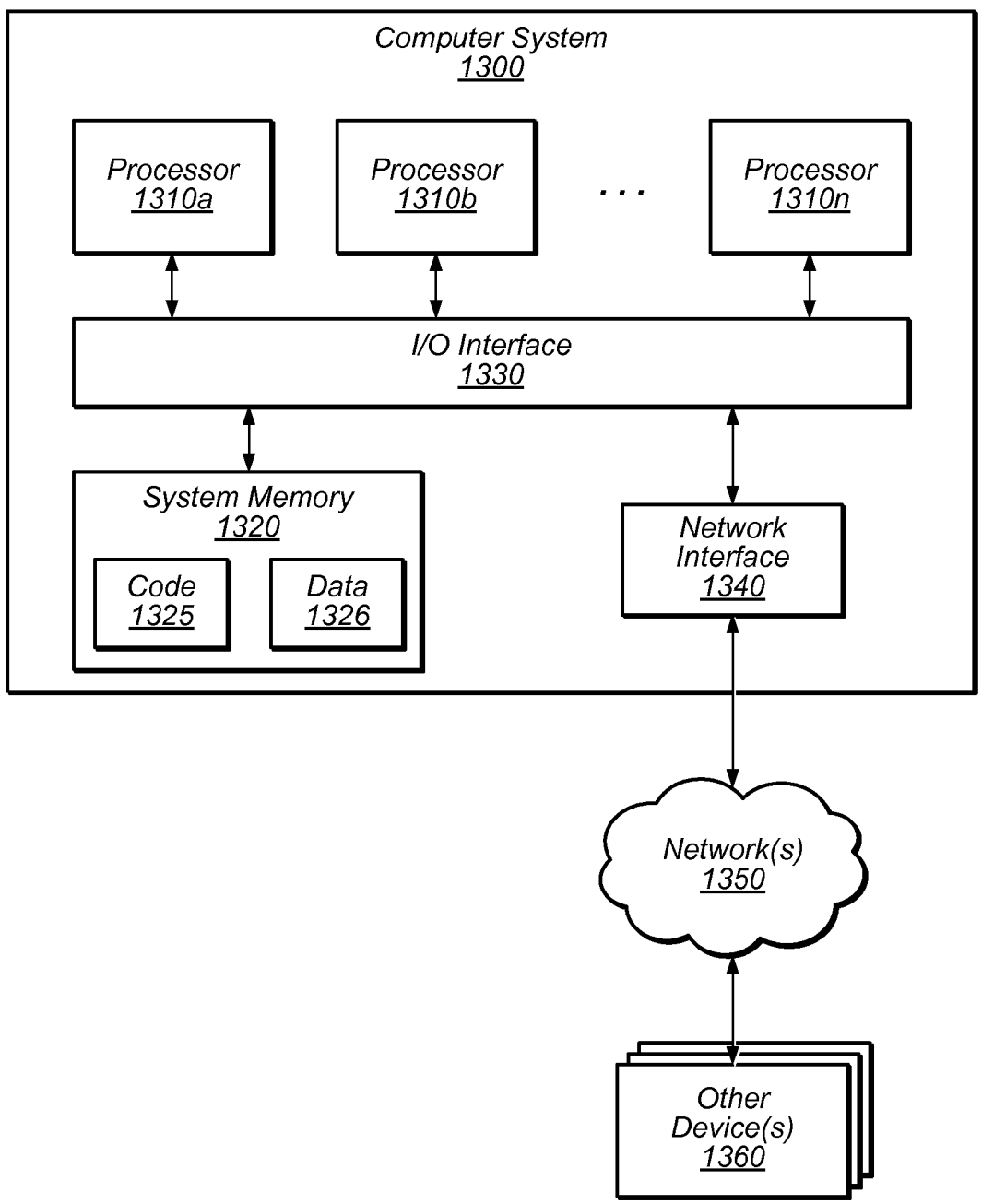
FIG. 13 is a block diagram illustrating an example computer system that may be used in some embodiments.

FIG. 13 is a block diagram illustrating an example computer system that may be used in some embodiments.

In some embodiments, a system that implements a portion or all of one or more of the technologies, including but not limited to a portion or all of a control system structured to control at least selective heating of some or all of an EC device, a control system structured to control at least selective heating of one or more regions of an EC device conductive layer, an end-user device which includes an EC device structured to selectively heat one or more regions of one or more layers of the EC device, and various methods, systems, components, devices, and apparatuses as described herein, may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of a control system structured to control at least selective heating of some or all of an EC device, a control system structured to control at least selective heating of one or more regions of an EC device conductive layer, an end-user device which includes an EC device structured to selectively heat one or more regions of one or more layers of the EC device, and various methods, systems, components, devices, and apparatuses as described herein, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIGS. 1 through 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data for implementing embodiments of methods as described above relative to FIGS. 1-12. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, a "module" is a component or a combination of components. A module may include functional elements and systems, such as computer systems, circuit boards, racks, blowers, ducts, and power distribution units, as well as structural elements, such a base, frame, housing, or container.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, the EC device includes a substrate which comprises a thin glass laminate, including a paper glass foil and a layer of adhesive. The thin glass laminate can include a glass foil that is approximates 25 micrometers in thickness. In some embodiments, the thin glass laminate can include one or more various thickness. For example, the thin glass laminate can be approximately 50 micrometers in thickness.

In some embodiments, photochromic or thermochromic materials may be used in place or in addition to the electrochromic (EC) materials disclosed herein. For example, some regions of a device may comprise electrochromic materials, including an EC stack, while other regions may comprise at least one of an electrochromic, photochromic, or thermochromic material. Suitable photochromic materials include, but are not limited to, triaryl-methanes, stilbenes, azastilbenes, nitrones, fulgides, spriropyrans, naphthopyrans, sprio-oxazines, and quinones. Suitable thermochromic materials include, but are not limited to, liquid crystals and leuco dyes. Both photochromic and thermochromic materials can be formed on the substrate in a well-known manner. No bus bars, electrodes, etc. would be needed for photochromic or thermochromic dynamic regions because light and heat respectively modulate the properties of the materials. One exemplary embodiment using photochromic and/or thermochromic dynamic regions could be a window having at least one electrochromic dynamic region towards the top of the window that is actively controlled for daylighting, to selectively switch between one or more particular transmission patterns, etc., and at least one photochromic dynamic region towards the bottom of the window that self-darkens when under direct light, and at least a second electrochromic region posited in another region of the device.

In some embodiments, one or more EC devices can be used as an aperture filter, iris, etc. for a camera device, and may be structured to selectively apodize, as discussed further above. In some embodiments, one or more EC devices can be included in architectural 'motherboards' which can be shipped across extended distance before further processing. In some embodiments, one or more EC devices can be included in one or more single pane windows for transportation applications and other uses where weight is important. In some embodiments, one or more EC devices, including one or more EC devices which include a single substrate, can be used to hide or reveal information on displays for hand held devices, computers, etc. In some embodiments, one or more EC devices can be used in dynamic eyewear.

Further, it should be understood that one embodiment of the subject matter disclosed herein can comprise a window, including an architectural window, having a single pane, or lite, that comprises a plurality of independently controlled dynamic regions. Another embodiment of the subject matter disclosed herein comprises an insulated glazing unit ("IGU") comprising multiple regions of electrochromic window on one pane and clear glass on the other pane. Yet another embodiment of the subject matter disclosed herein comprises an IGU comprising multiple regions of electrochromic window on one pane and a low-E, tinted, or reflective glass on the other pane. Still another embodiment of the subject matter disclosed herein comprises an IGU comprising multiple regions of electrochromic window on one pane of the IGU and a patterned or special glass on the other pane in which the patterning or features may match, compliment, and/or contrast the areas of dynamic regions on the first pane. It should be understood that the foregoing embodiments can be configured, structured, etc. so that the lite comprising the plurality of dynamic region is a clear lite, a low-E lite, a reflective, and/or partially reflective lite.

In some embodiments, one or more EC devices, including one or more of the EC devices, end-user devices, control systems, etc. illustrated and disclosed with reference to one or more of FIGS. 1-14, can be included in various applications, including EC displays, transportation windows, architectural glass applications, etc.

In some embodiments, one or more EC devices include separate EC regions, where the EC device is structured to cause one or more of the EC regions to switch transmission levels faster than one or more other EC regions, based at least in part upon varying the heating of various regions of the EC device. Such varying of heating of various regions can include varying heating of various regions of one or more conductive layers included in the EC device.

In some embodiments, one or more thermoelectric heat transfer devices can be coupled to an EC device to structure the EC device to heat one or more EC regions while switching one or more EC regions, which can include at least some of the one or more EC regions being heated, between different transmission levels.

In some embodiments, an EC device include one or more thermocouples which can be used to control heating of one or more portions of the EC device to one or more particular temperatures. Such control can enable conservation of energy expenditures, for example precluding heating when the temperature of the EC device is above a certain threshold temperature and enabling heating when the temperature of the EC device is below a certain threshold temperature, which can be a different threshold temperature. Temperature data from such a thermocouple can be used by a control system to control heating of one or more portions of the EC device to maintain a particular constant switching temperature in one or more portions of the EC device. Such temperature data can be used by a control system to determine a time at which the EC device is to be switched, based at least in part upon the current temperature of one or more portions of the EC device.

In some embodiments, an EC device is included in a device, including an end-user device, which includes one or more heat sources. Such heat sources can be used, in some embodiments, to heat one or more portions of the EC device. For example, an electric current utilized to support operations by one or more other components of an end-user device, such as an electric current supplied by a power source of a smartphone device to support a graphical user interface of the device, can be structured to flow through a mounting element for the EC device, for example, heating the EC device, or mounting the EC device on the heat sink for the battery, etc.

What is claimed is:

1. An apparatus, comprising:
an electrochromic device comprising at least two separate conductive layers, on opposite sides of an electrochromic (EC) film stack;
wherein the electrochromic device is structured to selectively heat a particular limited region of at least one conductive layer, of the at least two separate conductive layers, relative to a remainder region of the at least one conductive layer.

2. The apparatus of claim 1, wherein:
each of the at least two separate conductive layers comprises at least one set of electrodes, the at least one set of electrodes comprising at least two electrodes coupled to different regions of the respective conductive layer;
the electrochromic device is structured induce an electrical potential difference, perpendicular with the at least one conductive layer, between separate electrodes coupled to separate conductive layers of the at least two conductive layers to switch transmission levels of one or more regions of the EC film stack; and
to selectively heat a particular limited region of at least one conductive layer, relative to a remainder region, the at least one conductive layer is structured to induce an electrical potential difference, in parallel with the at least one conductive layer, between at least two separate electrodes coupled to the at least one conductive layer.

3. The apparatus of claim 2, wherein:
the electrochromic device comprises a short of the EC film stack which is structured to heat at least a portion of the EC film stack proximate to the short based at least in part upon a current induced through the short; and
to selectively heat a particular limited region of at least one conductive layer, relative to a remainder region of the at least one conductive layer, the electrochromic device is structured to induce current through the short of the EC film stack via at least the at least one conductive layer.

4. The apparatus of claim 3, wherein:
the at least one conductive layer of the at least two separate conductive layers is structured to include a first sheet resistance associated with heating of the EC device; and
at least one other conductive layer of the at least two separate conductive layers is structured to restrict the current through the short of the EC film stack, wherein, to restrict the current through the short of the EC film stack, the at least one other conductive layer comprises at least one region which has a second sheet resistance which is greater than the first sheet resistance.

5. The apparatus of claim 1, wherein:
the at least one conductive layer, of the at least two separate conductive layers, is separated from the EC film stack by at least one intermediate layer and another conductive layer that is adjacent to the EC film stack, wherein the at least one conductive layer is coupled to the another conductive layer via the intermediate layer.

6. The apparatus of claim 5, wherein the at least one conductive layer comprises a substrate to which the EC film stack is coupled.

7. The apparatus of claim 1, wherein:
the at least one conductive layer comprises at least one set of electrodes coupled to the at least one conductive layer, wherein each set of electrodes comprises at least two electrodes which are coupled to different regions of the at least one conductive layer;
wherein a boundary of the particular limited region is at least partially established by at least two electrodes coupled to the at least one conductive layer.

8. The apparatus of claim 1, wherein:
a sheet resistance of the particular limited region of the at least one conductive layer is greater than a sheet resistance of the remainder region of the at least one conductive layer.

9. The apparatus of claim 8, wherein:
the sheet resistance of the particular limited region of the at least one conductive layer is greater than the sheet resistance of the remainder region of the at least one conductive layer, based at least in part upon a geometric structure of the at least one conductive layer.

10. The apparatus of claim 8, wherein:
the particular limited region of the at least one conductive layer and the remainder region of the at least one conductive layer each comprise a separate distribution of at least one chemical species.

11. A method comprising:
structuring an electrochromic device, which comprises an electrochromic (EC) film stack located between at least two conductive layers, to selectively heat a particular limited region of at least one conductive layer of the at least two conductive layers, such that the electrochromic device is structured to increase a transmission level switching rate of at least a portion of the EC film stack, based at least in part upon selective heating of the particular limited region of the at least one conductive layer.

12. The method of claim 11, wherein:
structuring the electrochromic device to selectively heat a particular limited region of at least one conductive layer of the at least two conductive layers comprises:
structuring the particular limited region to comprise a particular sheet resistance, and
structuring the remainder region to comprise another sheet resistance,
wherein the particular sheet resistance is greater than the another sheet resistance.

13. The method of claim 12, wherein:
the particular sheet resistance is greater than the another sheet resistance, based at least in part upon separate distributions of at least one chemical species included in the separate particular limited region and the remainder region of the at least one conductive layer.

14. The method of claim 11, wherein:
structuring an electrochromic device to selectively heat a particular limited region of at least one conductive layer comprises:
coupling the at least one conductive layer to another conductive layer, which is coupled to the EC film stack, via at least one intermediate layer.

15. The method of claim 11, wherein:
structuring the electrochromic device to selectively heat a particular limited region of at least one conductive layer comprises:
installing a short of the EC film stack; and
structuring the electrochromic device to induce current through the short of the EC film stack via at least the at least one conductive layer.

16. The method of claim 15, wherein:
the at least one conductive layer of the at least two separate conductive layers is structured to induce a first electrical potential difference, in parallel with the at least one conductive layer, to induce current through the short of the EC film stack and to heat at least a portion of the EC film stack; and
at least one other conductive layer of the at least two separate conductive layers is structured to restrict the current through the short of the EC film stack, based at least in part upon a sheet resistance of at least one region of the at least one other conductive layer which is greater than a sheet resistance of the at least one conductive layer.

17. An apparatus, comprising:
an electrochromic (EC) film stack; and
a conductive layer coupled to the EC film stack structured to generate heat, in a particular limited region of the conductive layer, to selectively heat at least a corresponding region of the EC film stack.

18. The apparatus of claim 17, wherein the conductive layer is coupled to the EC film stack via coupling with another conductive layer, which is adjacent to the EC film stack, via an intermediate layer.

19. The apparatus of claim 17, wherein:
a sheet resistance of the particular limited region of the conductive layer is greater than a sheet resistance of the remainder region of the conductive layer.

20. The apparatus of claim 17, wherein:
the sheet resistance of the particular limited region of the at least one conductive layer is greater than the sheet resistance of the remainder region of the at least one conductive layer, based at least in part upon a geometric structure of the at least one conductive layer.

\* \* \* \* \*